US009722972B2

(12) United States Patent
Ahmed et al.

(10) Patent No.: US 9,722,972 B2
(45) Date of Patent: Aug. 1, 2017

(54) METHODS AND APPARATUSES FOR SECURE COMMUNICATION

(75) Inventors: Ali K. Ahmed, Sunnyvale, CA (US); John Jules Alexander Boyer, Ottawa (CA); Kenneth Montagna, Corpus Christi, TX (US); Timothy Michael Shephard, Gibsons (CA)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 13/405,357

(22) Filed: Feb. 26, 2012

(65) Prior Publication Data

US 2013/0227291 A1 Aug. 29, 2013

(51) Int. Cl.
*H04L 9/32* (2006.01)
*H04L 29/06* (2006.01)

(52) U.S. Cl.
CPC ...... *H04L 63/0281* (2013.01); *H04L 63/0807* (2013.01); *H04L 63/0884* (2013.01); *H04L 63/0209* (2013.01); *H04L 63/168* (2013.01)

(58) Field of Classification Search
USPC ......................................................... 713/171
See application file for complete search history.

(56) References Cited

U.S. PATENT DOCUMENTS

| | | | |
|---|---|---|---|
| 5,892,904 A | | 4/1999 | Atkinson et al. |
| 5,923,756 A | * | 7/1999 | Shambroom ................ 713/156 |
| 6,052,739 A | | 4/2000 | Bopardikar et al. |
| 6,151,606 A | | 11/2000 | Mendez |
| 6,226,618 B1 | | 5/2001 | Downs et al. |
| 6,317,868 B1 | | 11/2001 | Grimm et al. |
| 6,324,648 B1 | | 11/2001 | Grantges, Jr. |
| 6,484,276 B1 | | 11/2002 | Singh et al. |
| 6,735,763 B1 | | 5/2004 | Enokida |
| 6,993,137 B2 | | 1/2006 | Fransdonk |
| 6,996,808 B1 | | 2/2006 | Niewiadomski et al. |
| 7,159,120 B2 | | 1/2007 | Muratov |
| 7,184,801 B2 | | 2/2007 | Farcasiu |
| 7,243,163 B1 | | 7/2007 | Friend et al. |

(Continued)

FOREIGN PATENT DOCUMENTS

| | | |
|---|---|---|
| CN | 104903905 | 9/2015 |
| CN | 104903909 | 9/2015 |

(Continued)

OTHER PUBLICATIONS

Extended European Search Report, Jun. 6, 2013, European Patent Office.

(Continued)

*Primary Examiner* — Esther B Henderson
(74) *Attorney, Agent, or Firm* — Kilpatrick Townsend & Stockton LLP

(57) ABSTRACT

A method of establishing a secure communications path between a first local server on a local network and a device on a wide area network comprising: establishing a first secure communications connection between a second local server on the local network and the device; establishing a second secure communications connection between the second local server and the first local server, wherein the second local server impersonates the device for at least a portion of the connection request; and proxying data between the local server and the device.

49 Claims, 9 Drawing Sheets

(56) References Cited

U.S. PATENT DOCUMENTS

| | | |
|---|---|---|
| 7,275,073 B2 | 9/2007 | Ganji et al. |
| 7,447,799 B2 | 11/2008 | Kushner |
| 7,451,392 B1 | 11/2008 | Chalecki et al. |
| 7,596,565 B2 | 9/2009 | Friend et al. |
| 7,620,001 B2 | 11/2009 | Ganji |
| 7,620,392 B1 | 11/2009 | Maurya et al. |
| 7,702,322 B1 | 4/2010 | Maurya et al. |
| 7,788,382 B1 | 8/2010 | Jones et al. |
| 7,849,451 B2 | 12/2010 | Palacz et al. |
| 7,886,148 B2 | 2/2011 | Kiriansky et al. |
| 7,920,631 B2 | 4/2011 | Vicars-Harris |
| 7,984,157 B2* | 7/2011 | Panasyuk .......... H04L 12/4633 709/227 |
| 8,001,082 B1 | 8/2011 | Muratov |
| 8,261,320 B1 | 9/2012 | Serenyi et al. |
| 8,284,933 B2 | 10/2012 | Chaisson et al. |
| 8,549,656 B2 | 10/2013 | Blaisdell et al. |
| 8,584,118 B2 | 11/2013 | Kotamarthi et al. |
| 8,595,841 B2 | 11/2013 | Britton et al. |
| 9,129,112 B2 | 9/2015 | Boyer et al. |
| 9,158,935 B2 | 10/2015 | Livshits et al. |
| 9,246,893 B2 | 1/2016 | Boyer et al. |
| 9,344,422 B2 | 5/2016 | Aamir et al. |
| 9,563,772 B2 | 2/2017 | Boyer et al. |
| 9,602,549 B2 | 3/2017 | Boyer et al. |
| 2001/0047365 A1 | 11/2001 | Yonaitis |
| 2001/0047510 A1 | 11/2001 | Angel et al. |
| 2002/0073402 A1 | 6/2002 | Sangavarapu et al. |
| 2002/0099902 A1 | 7/2002 | Comeau |
| 2002/0169954 A1 | 11/2002 | Bandini et al. |
| 2003/0182460 A1 | 9/2003 | Khare |
| 2004/0006630 A1 | 1/2004 | Friend et al. |
| 2004/0117310 A1 | 6/2004 | Mendez et al. |
| 2004/0163088 A1 | 8/2004 | Frender et al. |
| 2004/0172640 A1 | 9/2004 | Luo et al. |
| 2004/0224675 A1 | 11/2004 | Puskoor et al. |
| 2005/0033983 A1 | 2/2005 | Takekawa et al. |
| 2005/0039186 A1 | 2/2005 | Borkan |
| 2005/0154886 A1 | 7/2005 | Birk et al. |
| 2005/0240943 A1 | 10/2005 | Smith et al. |
| 2006/0026430 A1 | 2/2006 | Luo |
| 2006/0190934 A1 | 8/2006 | Kielstra et al. |
| 2006/0277408 A1 | 12/2006 | Bhat et al. |
| 2007/0016961 A1 | 1/2007 | Vogler et al. |
| 2007/0157134 A1 | 7/2007 | Cheng et al. |
| 2007/0234408 A1* | 10/2007 | Burch et al. .................. 726/6 |
| 2007/0250539 A1 | 10/2007 | Montgomery |
| 2008/0037593 A1 | 2/2008 | Friedman et al. |
| 2008/0060080 A1 | 3/2008 | Lim |
| 2008/0134311 A1* | 6/2008 | Medvinsky et al. ............ 726/7 |
| 2008/0289019 A1 | 11/2008 | Lam |
| 2008/0292103 A1 | 11/2008 | Lee et al. |
| 2008/0307300 A1 | 12/2008 | Kitayama et al. |
| 2008/0320566 A1* | 12/2008 | Herzog et al. .................. 726/4 |
| 2009/0044103 A1 | 2/2009 | Chalecki et al. |
| 2009/0222474 A1 | 9/2009 | Alpern et al. |
| 2009/0222792 A1 | 9/2009 | Shanbhogue et al. |
| 2009/0228716 A1 | 9/2009 | Poston et al. |
| 2009/0288143 A1* | 11/2009 | Stebila et al. .................. 726/3 |
| 2009/0300656 A1 | 12/2009 | Bosworth et al. |
| 2009/0307191 A1 | 12/2009 | Li et al. |
| 2010/0042396 A1 | 2/2010 | Cassani et al. |
| 2010/0057845 A1 | 3/2010 | Thomas et al. |
| 2010/0131925 A1 | 5/2010 | Gutfleisch |
| 2010/0138905 A1* | 6/2010 | Kass ................ G06F 21/33 726/7 |
| 2010/0154041 A1 | 6/2010 | Dalzell et al. |
| 2010/0174974 A1 | 7/2010 | Brisebois et al. |
| 2010/0212028 A1 | 8/2010 | Eriksson et al. |
| 2010/0241657 A1 | 9/2010 | Parks et al. |
| 2010/0281475 A1 | 11/2010 | Jain et al. |
| 2011/0035593 A1 | 2/2011 | Pyle et al. |
| 2011/0047451 A1 | 2/2011 | Jardine-Skinner et al. |
| 2011/0083069 A1 | 4/2011 | Paul et al. |
| 2011/0107089 A1 | 5/2011 | Koottayi et al. |
| 2011/0185040 A1 | 7/2011 | Schmidt |
| 2011/0191593 A1 | 8/2011 | Cheng |
| 2011/0258345 A1 | 10/2011 | Bhanote |
| 2012/0047425 A1 | 2/2012 | Ahmed |
| 2012/0047451 A1 | 2/2012 | Marmaros |
| 2012/0066601 A1 | 3/2012 | Zazula et al. |
| 2013/0014275 A1 | 1/2013 | Goodes et al. |
| 2013/0262687 A1 | 10/2013 | Avery et al. |
| 2013/0283335 A1 | 10/2013 | Lakshminarayanan et al. |
| 2013/0297700 A1 | 11/2013 | Hayton et al. |
| 2013/0326221 A1 | 12/2013 | Murphy et al. |
| 2013/0332723 A1 | 12/2013 | Tan et al. |
| 2014/0018048 A1 | 1/2014 | Anand et al. |
| 2014/0032691 A1 | 1/2014 | Barton et al. |
| 2014/0173700 A1 | 6/2014 | Awan et al. |
| 2014/0181803 A1 | 6/2014 | Cooper et al. |
| 2014/0281548 A1 | 9/2014 | Boyer et al. |
| 2014/0282465 A1 | 9/2014 | Matenaar et al. |
| 2014/0282833 A1 | 9/2014 | Boyer et al. |
| 2014/0325664 A1 | 10/2014 | Nekhoroshev |
| 2014/0334289 A1 | 11/2014 | Hyde et al. |
| 2015/0066859 A1 | 3/2015 | Blake |
| 2015/0220541 A1 | 8/2015 | Parameswaran et al. |
| 2015/0309789 A1 | 10/2015 | Thorat |
| 2015/0371045 A1 | 12/2015 | Boyer et al. |
| 2016/0087953 A1 | 3/2016 | Aamir et al. |
| 2016/0112458 A1 | 4/2016 | Boyer et al. |
| 2016/0241598 A1 | 8/2016 | Aamir et al. |
| 2016/0286544 A1 | 9/2016 | Ikeda et al. |

FOREIGN PATENT DOCUMENTS

| | | |
|---|---|---|
| CN | 104904181 | 9/2015 |
| EP | 474131 | 3/1992 |
| EP | 1122640 | 8/2001 |
| EP | 1458151 | 9/2004 |
| EP | 1577736 | 9/2005 |
| EP | 1 841 174 A1 | 10/2007 |
| EP | 2632108 | 8/2013 |
| EP | 2692162 | 2/2014 |
| EP | 2973140 | 1/2016 |
| EP | 2973142 | 1/2016 |
| EP | 2973183 | 1/2016 |
| EP | 2632108 | 11/2016 |
| JP | 2016512374 | 4/2016 |
| JP | 2016513945 | 5/2016 |
| JP | 2016514912 | 5/2016 |
| WO | 9726731 | 7/1997 |
| WO | 03102753 | 12/2003 |
| WO | WO 2007/047183 A2 | 4/2007 |
| WO | 2014144939 | 9/2014 |
| WO | 2014144961 | 9/2014 |
| WO | 2014145039 | 9/2014 |
| WO | 2016048404 | 3/2016 |

OTHER PUBLICATIONS

U.S. Appl. No. 13/215,178, Non-Final Office Action mailed on Sep. 22, 2016, 17 pages.
U.S. Appl. No. 14/842,608, Notice of Allowance mailed on Aug. 30, 2016, 10 pages.
U.S. Appl. No. 14/842,608, Notice of Allowance mailed on Sep. 23, 2016, 7 pages.
U.S. Appl. No. 14/970,477, Non-Final Office Action mailed on Sep. 23, 2016, 14 pages.
European Application No. 14764811.7, Extended European search report mailed on Sep. 19, 2016, 9 pages.
European Application No. 14765558.3, Extended European Search Report mailed on Aug. 11, 2016, 7 pages.
International Application No. PCT/US2015/011136, International Preliminary Report on Patentability mailed on Sep. 28, 2016, 10 pages.
U.S. Appl. No. 14/842,608, Notice of Allowance mailed on Nov. 8, 2016, 7 pages.
Huawei AnyOffice Mobile Security Solution, Huawei Technologies Co., http://enterprise.huawei.com/ilink/enenterprise/down load /HW_277458, 2013, 12 pages.

(56) References Cited

OTHER PUBLICATIONS

About EASE, https://apperian.jira.com/wiki/display/rub/Appiication+Policies#ApplicationPolicies EncryptedDAR(DataRest), Feb. 26, 2013, 10 pages App Sense RapSphere, 10 pages.
App Sense RapSphere, http://www.consumerizeit.com/blogs/consumerizations/archive/2012/05/11/citrix-synergy-2012-video-a-first-look-at-appsense-rapsphere-mobile-app-management-and-app-wrapping.aspx, May 11, 2012, 3 pages.
Article on Mocana Mobile, http://www.consumerizeit.com/blogs/consumerization/archive/2012/06/08/app-wrapping-withmocana-mobile-app-protection.aspx, Aug. 6, 2012, 2 pages.
CloudGateway, http://www.comsumerizeit.com/blogs/consumerization/archive/2012/05/11/citrix-synergy-2012-video-cloudaatewav-2-mobile-application-manaqement.aspx, May 11, 2012, 3 pages.
Google Groups on iOS Swizzle, https://groups.google.com/forum/#lmsg/three20/6mBrQRRVVXnU/yxWNZuDmYOUJ, May 11, 2010, 24 pages.
How to re-sign Apple's applications once they've been modified, MacNN Forum thread, http://forums.macnn.com/79/cieveloper-center/355720/how-re-sign-apples-applications-once/, Dec. 2, 2007, 4 pages.
Ios Place, http://blog.iosplace.com/?p=33, Oct. 1, 2010, 3 pages.
Landscapes in Mobile Application Security, Facilelogin, http://blog.facilelogin.com/2013/1O/landsca(2es-in-mobilea(2(21ication.html, Oct. 2013, 5 pages.
Mach-o-infection, https://reverse.put.as/wp-content/upoads/2011/06/mach-o_infection.ppt, 46 pages.
Network px blogspot, http://networkpx.blogspot.com/2009/09/about-lcdyldinfoontv-command.html, Sep. 20, 2009, 6 pages.
Stackoverflow, http://stackoverflow.com/guestions/882553'7/mach-o-symbol-stubs-ios, Jan. 11, 2012, 4 pages.
ELBAZ, Using Public Key Cryptography in Mobile Phones, Discretix Technologies,http://dev1.discretix.com/wpcontenUuploads/2013/02/Using_Public_Key_Cryptography_in_Mobile_Phones.pdf, Oct. 2002, 9 pages.
Mallikarjuna et al., Unveiling of Android Platform, Ijarcsse, vol. 3, Issue 7, http://www.ijarcsse.com/docs/papersNolume_3/7July2013N317-0441.pdf, Jul. 2013, pp. 1264-1267.
Miller et al., Chapter4: Code Signing and Memory Protections, iOS Hackers' Handbook, http://books.google.ca/books?id=1kDcjkcz9GwC&printsec=frontcover#v=onepage&q&f=false, May 8, 2012, pp. 69-105.
Singh, Mac OS X Internals: A Systems Approach, http://www.amazon.com/Mac-OS-Internals-Systems-Approach/dp/0321278542, Jun. 29, 2006, pp. 61-74.
Zdziarski, Hacking and Securing iOS Applications, https://www.amazon.com/Hacking-Securing-iOS-Applications-Hijacking/dp/1449318746/ref=pd_bxgy_b_img_b/184-9916216-5442607, Hacking Part-1, pp. 189-202; Hacking Part-2, pp. 149-156 and pp. 203-208, Jan. 25, 2012.
European Application No. 13156805.7, Office Action mailed on Apr. 13, 2015, 5 pages.
European Application No. 13156805.7, Office Action mailed on Oct. 29, 2015, 5 pages.
European Application No. 14762378.9, Extended European Search Report mailed on Jul. 1, 2016, 7 pages.
International Application No. PCT/US2014/029552, International Preliminary Report on Patentability mailed on Sep. 24, 2015, 11 pages.
International Application No. PCT/US2014/029552, International Search Report and Written Opinion mailed on Jul. 1, 2014, 15 pages.
International Application No. PCT/US2014/029586, International Preliminaiy Report on Patentability mailed on Sep. 24, 2015, 8 pages.
International Application No. PCT/US2014/029586, International Search Report and Written Opinion mailed on Jul. 31, 2014, 12 pages.
International Application No. PCT/US2014/029680, International Preliminary Report on Patentability mailed on Sep. 24, 2015, 9 pages.
International Application No. PCT/US2014/029680, International Search Report and Written Opinion mailed on Jul. 1, 2014, 15 pages.
International Application No. PCT/US2015/011136, International Search Report and Written Opinion mailed on Mar. 24, 2015, 12 pages.
International Application No. PCT/US2015/011136, Written Opinion mailed on Oct. 5, 2015, 10 pages.
U.S. Appl. No. 13/215,178, Final Office Action mailed on Oct. 5, 2015, 13 pages.
U.S. Appl. No. 13/215,178, Final Office Action mailed on Jul. 8, 2014, 16 pages.
U.S. Appl. No. 13/215,178, Non-Final Office Action mailed on Apr. 23, 2015, 15 pages.
U.S. Appl. No. 13/215,178, Non-Final Office Action mailed on Oct. 4, 2013, 22 pages.
U.S. Appl. No. 13/841,498, Non-Final Office Action mailed on Oct. 8, 2014, 18 pages.
U.S. Appl. No. 13/841,498, Notice of Allowance mailed on May 4, 2015, 11 pages.
U.S. Appl. No. 14/213,244, Final Office Action mailed on May 18, 2015, 13 pages.
U.S. Appl. No. 14/213,244, Non-Final Office Action mailed on Nov. 7, 2014, 11 pages.
U.S. Appl. No. 14/213,244, Notice of Allowance mailed on Sep. 18, 2015, 8 pages.
U.S. Appl. No. 14/213,244, Supplemental Notice of Allowability mailed on Oct. 14, 2015, 2 pages.
U.S. Appl. No. 14/594,377, Notice of Allowance mailed on Jan. 15, 2016, 22 pages.
U.S. Appl. No. 14/842,608, Non-Final Office Action mailed on Apr. 13, 2016, 13 pages.
U.S. Appl. No. 14/970,477, Final Office Action dated Dec. 22, 2016, 8 pages.
U.S. Appl. No. 14/970,477, Notice of Allowance dated Jan. 27, 2017, 5 pages.
U.S. Appl. No. 13/215,178, Notice of Allowance dated Mar. 8, 2017, 13 pages.
U.S. Appl. No. 15/140,404, Non-Final Office Action dated May 13, 2017, 19 pages.

\* cited by examiner

METHODS AND APPARATUSES FOR SECURE COMMUNICATION

FIELD

The present patent document relates to establishing secure communication connections between devices. In particular, the present patent document relates to methods, apparatuses and systems for authentication and communication on devices that do not have direct network access to the target authentication servers.

BACKGROUND

Today, many businesses use computer applications to interact with customers, vendors, partners and employees. Traditional access to these business computer applications requires a simple username and password to gain access to the application. However, as the level of sophistication of thieves trying to intercept and steal data has increased, so has the need for increased security measures. Furthermore, as the proliferation of smart phones and tablets that need and establish access to company data and applications from remote locations has increased, so has the vulnerability of corporate networks.

Many methods of establishing a secure connection between a client and a server exist. Those methods may be categorized into symmetric cryptography and asymmetric cryptography. In symmetric cryptography, the client and server encrypt and decrypt data using the same "private" key. As long as this key remains private, the data being transmitted is secure. One vulnerability with symmetric cryptography is the exchange of the private key. In many systems, the private key (often based on a username and password) may be initially exchanged in an unencrypted format. If the private key is exchanged in an unsecure manner prior to setting up the secure connection, the connection may be compromised. Retransmission of the private key every time a connection is desired further increases the likelihood that the key will be compromised.

One security implementation that completely avoids the transmission of the private key is asymmetric cryptography. Asymmetric cryptography or Public-key cryptography refers to a cryptographic system requiring two separate keys, one to lock or encrypt the data stream, and one to unlock or decrypt the encrypted data stream. Neither key will do both functions. One of these keys is published or public and the other is kept private. If the lock/encryption key is the one published then the system enables private communication from the public to the unlocking key's owner. If the unlock/decryption key is the one published then the system serves as a signature verifier of documents locked by the owner of the private key.

In asymmetric cryptography, a system simultaneously produces a mathematically linked key pair (i.e., a public and a private key) using an asymmetric key algorithm. The public key may be disseminated and used to transform a message into an unreadable form, decryptable only by using the different but matching private key. By publishing the public key, the key producer empowers anyone who gets a copy of the public key to produce messages only the producer can read—because only the key producer has a copy of the private key required for decryption. When someone wants to send a secure message to the creator of those keys, the sender encrypts the message using the intended recipient's public key; to decrypt the message, the recipient uses the private key. The public key can not be used to decrypt the message and accordingly, no one other than the holder of the private key, including the sender, can decrypt the message. One advantage of public-key cryptography is that private keys are never exchanged, thus eliminating a common security flaw found in symmetric key cryptography systems.

In addition to providing a secure connection, authentication, proving with increased certainty that the user trying to access the secure system is who they say they are, has become imperative to maintaining a secure system. While methods such as public-key cryptography and others have reduced or eliminated the unsecure transmission of secure login information, passwords and other secure login information may still be compromised through espionage or other methods. Accordingly, many networking communication systems employ a tiered or multifactor authentication approach using some type of security token.

Security tokens may be a physical device or software device that an authorized user of computer services is given to add another layer of authentication, two-factor authentication. Security tokens include smart cards, one-time password (OTP) tokens such as those from RSA Security, USB drives, and key fobs to name a few. Many security tokens provide a number that changes at set intervals and is synced with an authentication server. As long as the server and the token are in sync, the server can verify that the number entered by the user is valid within a certain time period and thus authenticate that the person logging in is in possession of the security token. In combination with a password or PIN, this provides multilevel authentication in that a potential intruder would need to compromise both the password and the security token to gain access. Other forms of security tokens may include biometric data such as fingerprint minutiae or digital signatures using a private key to further authenticate a client. Sometimes these additional authentication factors expire fairly quickly, for example within a minute, and much faster than a typical password to further increase security risks.

These additional authentication factors may be input to the client device in various ways. For disconnected tokens, a number may simply appear on the screen of the token and may then be input by hand into the client. Other tokens such as smart cards and USB tokens are physically connected to the client device. For security tokens that are physically connected, the client device must have supporting hardware such as a smart card reader or a USB port. This limits the ability of most mobile phones or tablets to use connected security tokens because most cell phones and tablets do not include the necessary hardware for reading smart cards or connecting USB devices.

In many security implementations verification of authentication information is handled by an authentication server. Authentication servers are servers that provide authentication services to users or other systems via a network. Remotely placed users and other servers provide passwords or security token information to be authenticated by such a server. Once the information is authenticated, the user or other system may receive cryptographic tickets which may then be exchanged to verify identity.

The use of an authentication server as a security measure limits access to only those user devices that are logged into a network that has direct access to the authentication servers. Although some authentication servers may be designed to authenticate clients outside the LAN, some authentication servers may be restricted to LAN access only in order to provide added security. A problem arises for corporations that would like to allow remote devices access to the services of these local authentication servers and the services they authenticate because the servers are not accessible outside the LAN. Accordingly, users may need to be directly connected to a dedicated network or use a virtual private network (VPN) technology like IPsec VPN or SSL VPN to get direct access to a the desired services.

The concept of using a VPN to enable remote users to access a dedicated network is well understood. However, in implementing VPNs as a security solution, it is assumed that the user device is owned and managed by the organization. The purpose of this ownership and management is to ensure the device does not have any rogue applications that can enter the dedicated network through a remote VPN established by the user. A rogue application may relay information to another source, install a virus or perform some other malicious activity.

With the new trend of using personally owned devices, enterprises no longer have full control over such devices. This creates a significant security hole for enterprises because a traditional existing VPN will give access to all applications on a device. Since the device is not owned or managed by the organization, there could be rogue applications on the device that exploit the VPN access established by the device.

One solution to some of the above problems and risks being employed by organizations is to disable VPN access to mobile devices and push end-users to web or web-service only front-end applications. While this strategy works well for simple authentication schemes like username/password, this model does not allow more complicated authentication schemes because the user device does not have access to authentication servers that reside on the organization's private dedicated network.

SUMMARY

In view of the foregoing, one aspect of the various disclosed embodiments in the present patent document is to provide improved methods and apparatuses for establishing secure communications paths between devices on a wide area network, for example a wireless network or the Internet, and servers on a local network. Preferably the methods and apparatuses address, or at least ameliorate, one or more of the problems described above. To this end, a method for establishing a secure communications path between a first local server on a local network and a device on a wide area network is provided. The method comprises establishing a first secure communications connection between a second local server on the local network and the device; establishing a second secure communications connection between the second local server and the first local server, wherein the second local server impersonates the device for at least a portion of the connection request; and proxying data between the first local server and the device.

In another embodiment, the device limits access to the first secure communications connection to select applications. Limiting the access to the first secure communications connection ensures only intended applications have access to the communications connection established with the local network. Limiting the access only to authorized applications on the device helps ensure that an unauthorized application running on the device which might be a virus or intend harm to the local network does not have access to the secure communications connection established with the local network.

Access to the first secure communications connection may be limited in other ways. In yet another embodiment, the second server limits access to the first secure communications connection to selected applications.

In some embodiments, the second secure communications connection is established using a strong network authentication protocol. In some of those embodiments, the strong network authentication protocol is Kerberos. Using a second server on the local network to establish a second secure communications connection allows more complicated authentication protocols to be used without implementing them on the device, and without requiring the device to have direct access to the first server on the local network.

In some embodiments, the second local server impersonates the device using Kerberos unconstrained delegation. In some other embodiments, the second local server impersonates the device using Kerberos constrained delegation. In some other embodiments, the second local server impersonates the device by coordinating a Kerberos PKINIT authentication using a private key stored on the device.

In yet other embodiments, the second local server impersonates the device by receiving a session key from the device over the first secure communications connection and using the session key to authenticate on behalf of the device. In various embodiments, the second local server may impersonate the device at various steps during authentication and connection to the first local server. In addition, in some embodiments the second local server may impersonate the device to an authentication server or ticket granting server. In various embodiments, the impersonation may be performed using various methods. In a preferred method the device sends the second local server a session key which allows the second server to impersonate the device to the rest of the local network.

In various different embodiments, the first secure communications connection may be initiated in different ways. In some embodiments, the first secure communications connection is established after the second local server intercepts a request from the device to the first local server. In some of those embodiments, the second local server redirects the request back to the device with instructions to establish the first secure communications connection.

In yet other embodiments, the first secure communications connection is established when one of the authorized applications starts.

In some embodiments, the second local server intercepts a request from the device to the first local server and redirects the request back to the device with instructions to resubmit the request with additional security information. In a preferred embodiment, the additional security information includes a session key.

In different embodiments, the local servers may be located in different locations within the local network. In some embodiments, the first local server and the second local server are separated by a LAN firewall and the second local server is located in a DMZ zone of the local network. In such an embodiment, the first local server has limited or no access to communicate with the wide area network.

Although different embodiments may include various different types of devices, in a preferred embodiment the device is a mobile device and in some embodiments the device is a cell phone or a tablet.

In another aspect of the embodiments disclosed herein, a system for establishing a secure communications path between a local server on a local network and a device on a wide area network is provided. The system comprises: a firewall separating the local network from the wide area network; a server located on the local network and in communication with both the wide area network and local network, wherein the server is configured to: form a first secure communications connection with the device; form a second secure communications connection with the local server; impersonate the device for at least a portion of the connection request; and proxy data between the local server and the device.

In some embodiments of the system, the device further comprises an application running on the device that limits access to the first secure communications connection to select applications.

In other embodiments of the system, the server limits access to the first secure communications connection to select applications.

In yet other embodiments, the server impersonates the device by receiving a session key from the device over the first secure communications connection and uses the session key to establish the second secure communications connection. In some embodiments using a session key, the session key is decrypted by the device using a key the device knows. In some embodiments using a session key, the session key is encrypted by the device and sent to the server using a key the server knows. In some embodiments using a session key, the session key is decrypted using an intermediate key, where the intermediate key was previously decrypted by the device using a key the device knows. In some embodiments using a session key, the session key may be established on the device or server using a key exchange protocol, for example Diffie-Helman.

Different network configurations may be used with different embodiments. In some embodiments, the system further comprises a second firewall separating the server and the local server. In some embodiments, the system further comprises an authentication server on the local network, which authenticates connections to the local server. In some embodiments, the server is located in a DMZ zone of the local network. In a preferred embodiment, the local server and the authentication server have limited or no access to communicate with the wide area network.

The system may be used to support different authentication and security protocols. In some embodiments, the second secure communications connection is established using a strong network authentication protocol. In embodiments where a strong authentication protocol is used, the strong network authentication protocol may be Kerberos.

In some embodiments, the server impersonates the device to the authentication server by receiving a session key from the device over the first secure communications connection. In a preferred embodiment, the device is a cell phone or a tablet.

In yet another aspect of the present patent document, a method of establishing a secure communications path between a device on a wide area network and a server on a local network is provided. The method includes the steps of establishing a communications connection between the device and the server, wherein the connection is established by an application running on the device that limits access to the secure communications connection to select applications.

The secure communications connection may be initiated in various different ways. In some embodiments, the secure communications connection is established after the server intercepts a request from a select application on the device to a local server on a local network. In yet other embodiments, the secure communications connection is established after the application running on the device that limits access to the communications connection intercepts a request from a select application on the device to a local server on a local network. In yet other embodiments, the secure communications connection is established when the application running on the device that limits access to the communications connection starts. In yet other embodiments, the secure communications connection is established when one of the select applications starts. In some embodiments, the server redirects requests from select applications that occur outside the secure communications connection back to the application running on the device that limits access to the secure communications connection. In some of those embodiments the redirected requests are resubmitted inside the secure communications connection. In some of those embodiments the redirected requests are resubmitted outside the secure communications connection with additional security information.

DETAILED DESCRIPTION OF THE EMBODIMENTS

Figure 1:
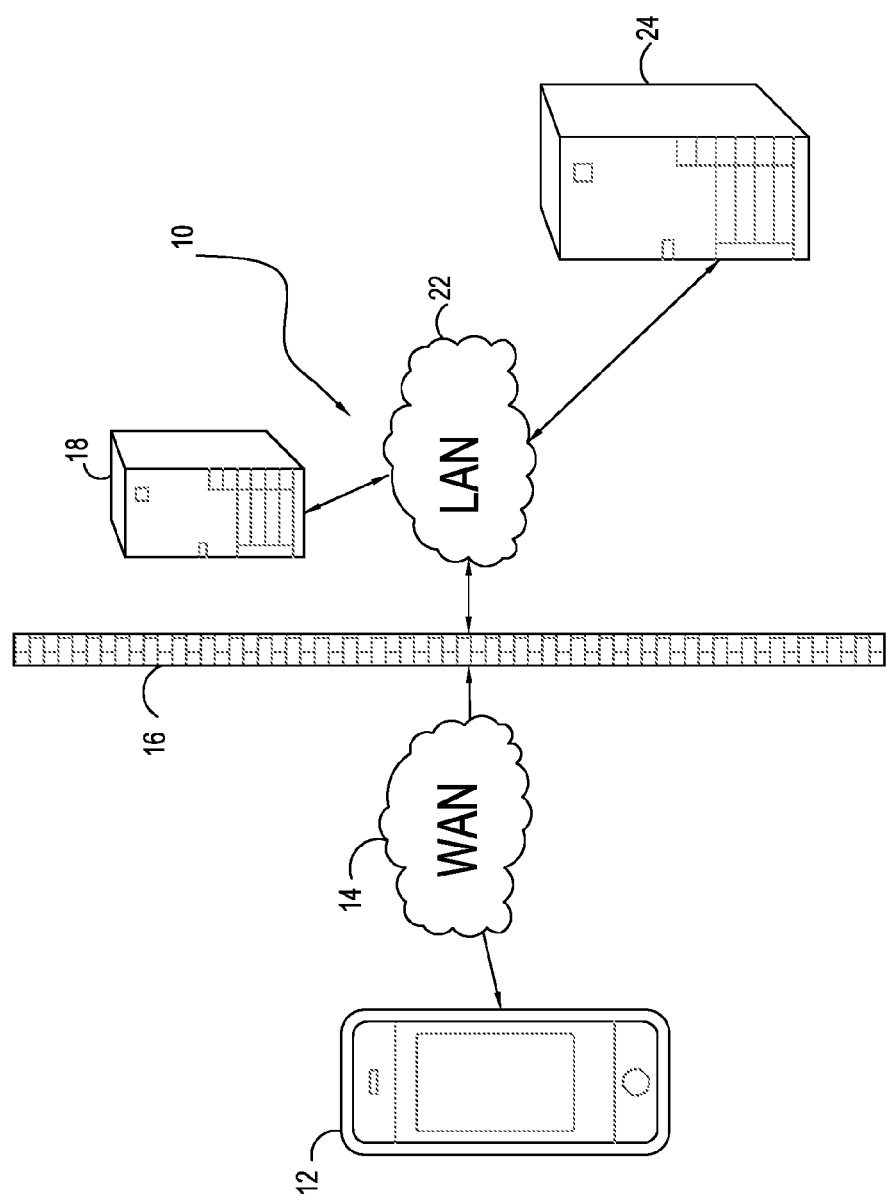
FIG. 1 illustrates one embodiment of a system for establishing a secure communications path between a local server on a local network and a device on a wide area network.

The following detailed description includes representative examples utilizing numerous features and teachings, both separately and in combination, and describes numerous embodiments in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and sequences of operations which are performed within a computer memory. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

The embodiments disclosed also relate to an apparatus and/or system for performing the operations herein. This system may be specially constructed for the required purposes, or it may comprise a general purpose processor selectively activated or reconfigured by a computer program stored in the electronic device. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, Flash memory, magnetic or optical cards, or any type of media suitable for storing electronic instructions, and each coupled to a computer system bus.

The algorithms presented herein are not inherently related to any particular electronic device or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the embodiments as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present patent document describes unique systems and methods for enabling devices, especially mobile devices, to establish secure connections using advanced authentication protocols, in particular strong authentication protocols. To this end, numerous protocols and standards are discussed and used in combination with the embodiments discussed herein. Although the embodiments described herein may be used in combination with any protocol or standard, the following protocols and standards are incorporated herein by reference in their entirety: IETF RFC 2631 (Diffie-Hellman); IEEE 1363; IETF RFC 3280 (X.509 Public Key Infrastructure); IETF RFC 4120 (Kerberos V5); IETF RFC 4178 (SPNEGO); and IETF RFC 4556 (PKINIT for Kerberos).

One unique aspect of the embodiments disclosed in the present patent document is to allow authentication and connection by remote devices without direct network access. Many organizations are looking to enable strong authentication without providing traditional VPN access or any type of direct access to the internal dedicated network. Embodiments of the present patent document provide a simple yet powerful method that IT professionals may use to enforce end-user strong authentication credentials with strong authentication servers without giving the end-user device access to the dedicated network hosting the strong authentication servers. In a preferred embodiment, the device is authenticated and connects by using a server gateway that brokers connections between a secure container on the end-user device and servers on the local network that require authentication credentials. In various embodiments disclosed herein, an application on the end-user device may use the secure container authentication to gain access to applications provided by local servers on a secure LAN that requires authentication credentials from strong authentication servers.

The systems of the present patent document may include a server gateway and secure container on the end user device, wherein the server gateway is designed to virtualize the end-user device and broker authentication messages. In addition, the server gateway may further broker application access requests from the end-user device and applications that require authentication server credentials.

FIG. 1 illustrates one embodiment of a system 10 for establishing a secure communications path between a local server 24 on a local network 22 and a device 12 on a wide area network 14. The system 10 shown in FIG. 1 includes a device 12 in communication with a wide area network (WAN) 14, a first server 24 and a second server 18 in communication with a local area network (LAN) 22. WAN 14 and LAN 22 are separated by a firewall 16. In the embodiment shown in FIG. 1, firewall 16 allows the second server 18 to also communicate with the WAN 14 but limits the first server 24 to communication on the LAN 22. In other embodiments, other network configurations and access rules are possible.

As used herein a server is a physical computer (a hardware system) or a virtualized computer (a software system) operating inside a software virtualization environment running a computer program (as a host) dedicated to performing one or more services to serve the requests of other programs (clients), or to serve the needs of users of the other computers on the network. A server may be a database server, gateway server, file server, mail server, print server, web server, authentication server, server running custom applications, or any other type of server.

WAN 14 may be any type of network including wired or wireless, public or private, or combinations of each. WAN 14 may be any type of telecommunication network that covers a broad area (i.e., any network that links across metropolitan, regional, or national boundaries). For example, WAN 14 may be the Internet or public or private wireless system such as 3G, 4G, GSM, WiFi or any other type of wireless network or combinations of each.

LAN 22 may be any type of network with restricted access. LAN 22 may be any computer network that interconnects computers in a limited area such as a home, school, computer laboratory, or office building. In a preferred embedment LAN 22 is the network of a business, company, school, non-profit or other organization. While LANs are often defined by their physical proximity, there is no requirement that all computers on a LAN be physically close in proximity and in some embodiments, some computers on the LAN may be located at considerable distance as long as the necessary security is provided to the connection.

Firewall 16 may be any device that limits access to the LAN 22 from devices outside the network. Firewall 16 may be any device or set of devices designed to permit or deny network transmissions based upon a set of rules.

In a preferred embodiment, device 12 is a mobile device such as a smart phone, tablet, laptop, or other mobile computing device. However, device 12 may be any device including a wired or fixed device. The device 12 is located on the WAN 14 and is in communication with the WAN 14. The device 12 may be fixed or roam to different locations.

As shown in FIG. 1, the system 10 includes at least two servers 18 and 24. Other servers (not shown) may also be part of the system 10. The addition servers (not shown) may be located on either or both of the WAN 14 and LAN 22. In the system 10, the first server 24 is an application server running on the network. The application server 24 is limited to allowing only devices on the LAN 22 to connect to its services. The server 24 may limit access to its services by security policies on the server, security policies on the firewall 16 or combinations of both. Because the server 24 is limited to connecting with local devices only, device 12 located on the WAN 14 outside the firewall 16 cannot directly connect to server 24.

Figure 2:
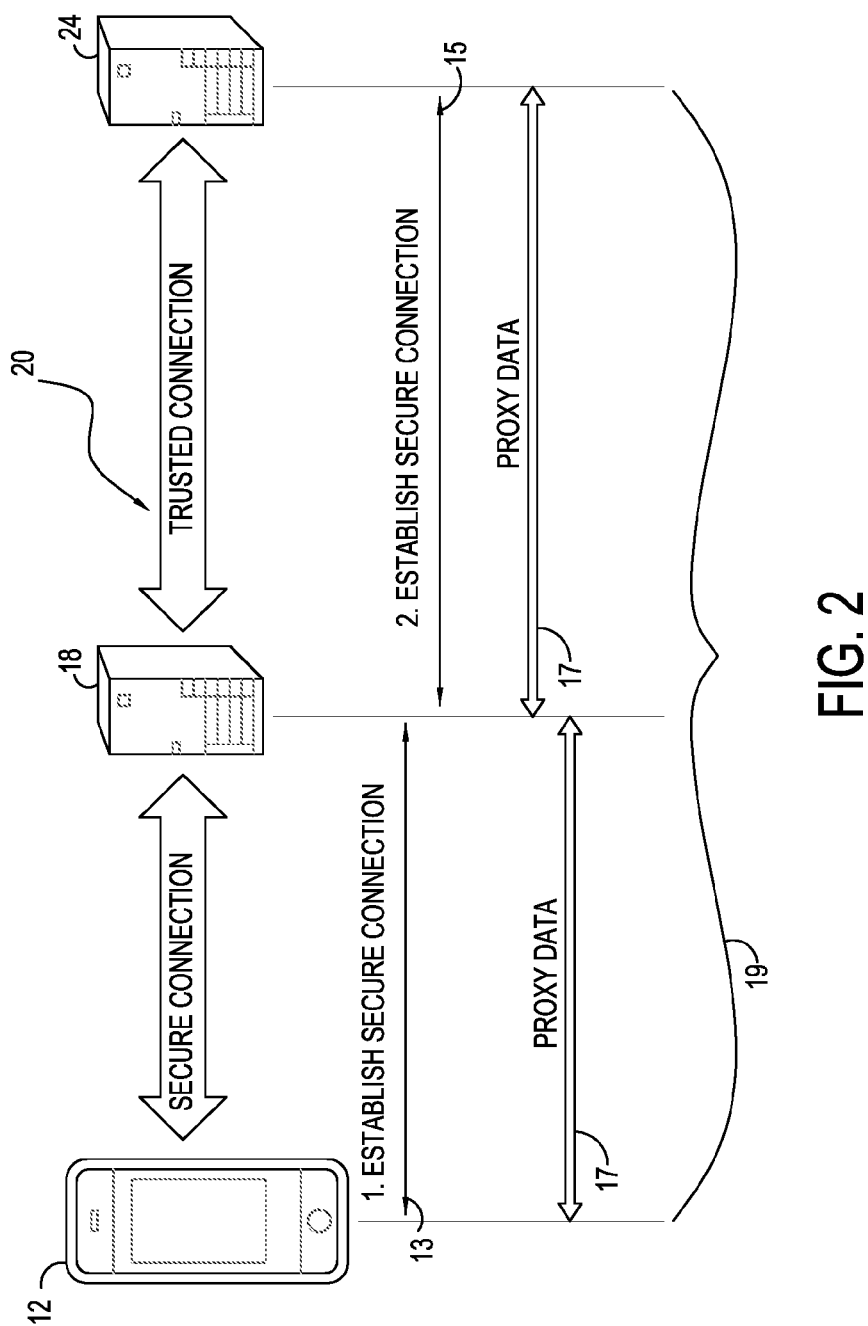
FIG. 2 illustrates one embodiment of a method of establishing a secure communications path between a first local server on a local network and a device on a wide area network.

FIG. 2 illustrates one embodiment of a method 20 of establishing a secure communications path 19 between a first local server 24 on a local network 22 and a device 12 on a wide area network 14. Such a method may be implemented on system 10.

In the embodiment shown in FIG. 2, a first secure communications connection 13 is established between device 12 and a second local server 18 on the local network. The secure communication connection may be any type of secure connection and includes any type of connection that provides security. Security may include authentication and/or encryption of the data.

In a preferred embodiment, device 12 establishes a secure communication connection with second local server 18 using a protocol that is easily run on the device 12. For example, in embodiments where the device 12 is a mobile device such as a cell phone, secure communications connection 13 preferably uses a standard security protocol such as those implemented within the operating system already running on the phone. A couple of non-limiting examples of protocols that may be used for secure communications connection 13 are transport layer security (TLS) or secure socket layer (SSL). In a preferred embodiment, device 12 establishes an SSL communications connection with second server 18. In other embodiments, other protocols may be used.

Once a first secure communications connection 13 is established between the device 12 and the second local server 18, a second secure communication connection 15 is established between second local server 18 and the first secure server 24. The second secure communication connection 15 may use a different secure protocol than the first secure communications connection 13. In some embodiments, the second secure protocol may use a strong authentication method while the first secure protocol uses a weak authentication method. In a preferred embodiment, the protocol and/or authentication used for the second secure communications connection 15 is a protocol that is not implemented on the device 12.

In a preferred embodiment, the second secure communications connection 15 uses a strong authentication protocol. Strong authentication is any authentication protocol that uses two-factor authentication or more generally, multi-factor authentication, or that uses strong cryptographic algorithms or protocols. Strong authentication protocols include any protocol that uses a layered authentication approach relying on two or more authenticators to establish the identity of an originator or receiver of information.

Some examples of strong authentication protocols that may be used in establishing the second secure communications connection 15 are Kerberos (RFC 4120), Kerberos including PKINIT (RFC 4556), and SPNEGO (RFC 4178) over HTTP or HTTPS. In other embodiments, other authentication and encryption protocols may be used.

Once the first and second secure communications connections are established, a secure communications path 19 may be established. In some of the embodiments disclosed herein, a secure communications path 19 is created by the second local server proxying data between the first local server and the device 12 over the two secure communications connections 13 and 15. In the embodiments disclosed in the present patent document, the second local server establishes the second secure connection on behalf of the device 12 and proxies the data 17 between the first local server 24 and the device 12. By allowing the second local server to make the second secure connection on behalf of the device 12, the device 12 is alleviated from having to support the protocol for the second secure connection. In addition, the first local server 24 may be further protected by ensuring the first local server 24 does not connect directly with any device outside the local network. Thus, the present patent document teaches methods and systems that enable the use of strong authentication schemes without requiring dedicated network access using a traditional VPN.

In addition to establishing the second secure communications connection 15 on behalf of the device 12, the second local server 18 may also impersonate the device for a portion of the authentication routine, all of the authentication routine, a portion of the connection, all of the connection, or any combination thereof.

The second local server 18 may also be referred to as a gateway server because with respect to the embodiments disclosed herein, the second local server 18 may act as a gateway to communications between devices 12 on the WAN 14 and local servers 24 on the LAN 22. The gateway server 18 includes software running on the server 18 that allows it to receive connection requests from the device 12 and establish a second secure connection with the first local server 24 on behalf of the device 12 and proxy the data 17 to create a secure communications path 19. The software running on the gateway server may also provide the second local server 18 with the ability to impersonate the device 12 to the local network and the servers attached thereto.

The gateway server 18 is designed to securely virtualize the device's 12 strong authentication credentials and remote location and broker all interaction between the authentication servers and applications on the device 12. In some embodiments, the gateway server 18 may be a virtual server or appliance running on a commercial OS or embedded environment. In other embodiments, the gateway server 18 may be a dedicated server with a custom software application to implement the steps described herein.

In a preferred embodiment, the device 12 also has software running on the device 12 that facilitates establishing the secure connection path with the local server 24 as described herein. In the process of establishing the secure communications path, the software may also help the gateway server 18 to impersonate the device 12. For example, the device 12 may pass a security token, security key, or any other piece of security information to, or perform a cryptographic operation for, the gateway server 18 to allow the gateway server 18 to impersonate the device 12 to the servers on the local network.

In some embodiments, the software running on the device 12 may be a secure container that limits access to the first secure communications connection to authorized applications running on the device. The secure container on the device may be designed to establish mutually authenticated secure connections to the server gateway. The secure container may be a standalone software application, a java type container that executes code or a web browser, or a native presentation layer abstraction technology like those described in U.S. patent application Ser. No. 13/215,178 titled Methods and Apparatuses for Interaction with Web Applications and Web Application Data, which is herein incorporated by reference in its entirety.

In a preferred embodiment, the secure container may accept or deny incoming requests from other applications. The secure container may be designed to allow only authorized external applications or container internal applications or abstractions to use the containers connection to the gateway server. The authorized applications may be a limited number of applications and such applications may have to register with the secure container or perform some other type of validation in order to gain access to the first secure connection and thus, the secure communications path 19.

In various different embodiments, the first secure communications connection 13 may be initiated in various different ways. In one embodiment, the first secure communications connection 13 may be established by the secure container or other application running on the device 12. In some embodiments, the establishment of the first secure communication connection 13 is initiated after the second local server 18 intercepts a communications request from any application running on the device 12 to the local server 24 located on the LAN 22. The communication request may be any type of communication request and includes but is not limited to an HTTP request, a TCP request, UDP request or even the very first packets sent to establish communication such as an ARP request. Communication requests may also include requests at higher protocol levels. In some embodiments, communication requests that originate from unauthorized applications may be dropped.

In yet another embodiment, the first secure communications connection 13 is established after the secure container or other application running on the device that is designed to limit access to the first secure communications connection 13 intercepts a communications request from any authorized application on the device to the local server 24 on the LAN 22.

In another embodiment, the secure communications connection 13 may be automatically established as soon as the secure container or other application running on the device designed to limit access to the first secure communications connection 13 starts. In yet another embodiment, the secure communications connection 13 may be automatically established as soon as one of a select number of authorized applications running on the device are initiated or start to execute.

In some embodiments, the first secure communications connection 13 may be established without establishing the entire secure communications path 19 from the device 12 to the first local server 24. In such embodiments, the second local server 18 may redirect communications requests from select authorized applications running on the device 12 that occur outside the secure communications connection 13 back to the secure container or other application running on the device designed to limit access. The secure container or other application designed to limit access may then assist in setting up the secure communications path 19 over the first secure communications connection 13 and through the second local server 18. For example in some embodiments, the redirected communications requests may be resubmitted inside the first secure communications connection 13. In some of those embodiments, the communications requests may be resubmitted with additional security information. In a subset of those embodiments, the additional security information may include a session key.

In yet other embodiments, second local server 18 may cause the communications requests to be redirected back to the secure container or other application designed to limit access running on the device 12, however, the redirected communications requests may be resubmitted outside the first secure communications connection 13 with additional security information. In some of these embodiments, the additional security information may include a session key.

Figure 3:
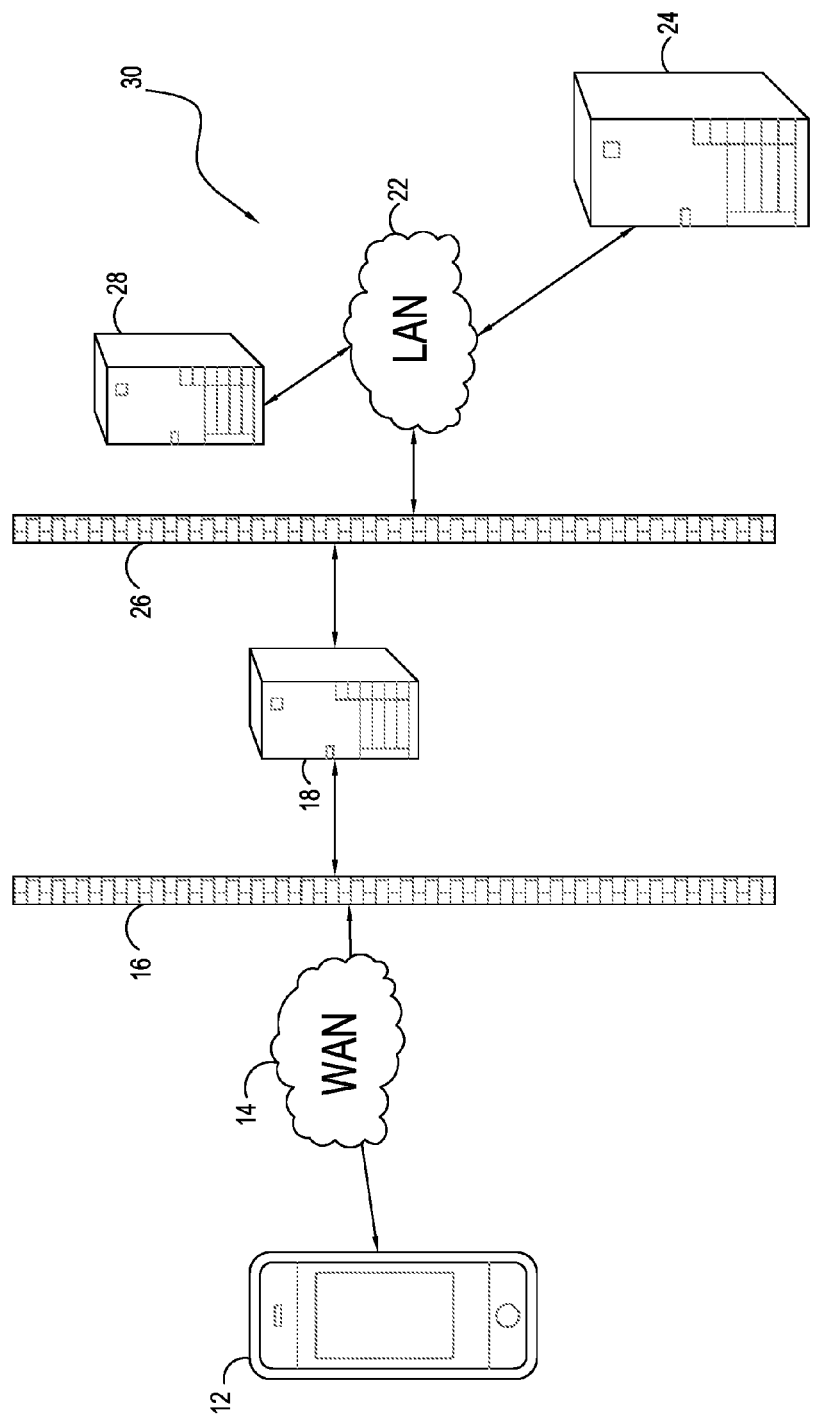
FIG. 3 illustrates one embodiment of a system for establishing a secure communications path between a local server on a local network and a device on a wide area network.

FIG. 3 illustrates one embodiment of a system 30 for establishing a secure communications path between a local server 24 on a local network 22 and a device 12 on a wide area network 14. The system 30 illustrated in FIG. 3 is similar to the embodiment of the system 10 illustrated in FIG. 1 except the system 30 includes a WAN firewall 16 and a LAN firewall 26 with the second local server 18 located outside the LAN firewall 26 but inside the WAN firewall 16. In addition, the system 30 includes a separate authentication server 28 located on the local network.

Some embodiments may place the gateway server 18 outside a LAN firewall 26 and inside a WAN firewall 16. Placing the gateway server 18 between two firewalls, a.k.a. in a demilitarized zone or DMZ, provides addition security to the system 30. Connections to devices located on the WAN 14 may be restricted to only local servers including those servers located in the DMZ. Accordingly, an additional level of security is provided at the LAN firewall 26. To this end, authentication server 28 and the first local server 24 are limited to communications with servers located on the LAN including those located in the DMZ. Separating the authentication server 28 from other servers on the network also provides additional security.

In the embodiment of the system shown in FIG. 3, the device 12 establishes a secure communications connection with the gateway server 18. The software on the device 12, which in a preferred embodiment is a secure container, requests a connection with the second local server 24 from the gateway server 18. In a preferred embodiment, the server 24 is an application server serving an application or providing application data that the device 12 is desirous of acquiring.

In a preferred embodiment, upon receiving the request to connect to the server 24, the gateway server 18 repackages the request and requests authentication for the connection from authentication server 28. The repackaging may be handled or directed by the software application running on the gateway server 18 designed to handle such requests from devices 12 located on the WAN 14. The repackaging may include repackaging the request to comply with an authentication protocol such as Kerberos or another authentication protocol. As explained above, having the gateway server 18 broker the authentication on behalf of device 12 prevents device 12 from having to have support for the authentication protocol located on the device. This is advantageous when the protocol is not commonly implemented on device 12 similar to the way Kerberos is not commonly implemented on mobile devices such as smart phones.

In some embodiments, the gateway server 18 may impersonate the device 12 to the authentication server and the other servers located on the LAN. In various embodiments, various methods of impersonating the device 12 may be incorporated by the gateway server 18. Impersonating device 12 includes substituting any information in, or adding any information to, the data packets sent to the LAN 22 to make the data packets coming from the gateway server 18 appear to the servers on the LAN 22 as if data packets originated from device 12. Impersonating device 12 may also include forwarding packets from the device 12 onto the LAN 22 and substituting information in, or adding information to, the data packets to make the packets appear to the servers on the LAN 22 as if they came from a device located on the LAN 22. Impersonating the device 12 may also include receiving some security information from the device 12 and then using the security information to insert the gateway device 18 in the place of the device 12 during the authentication and connection process with the authentication server 28 and the first local server 24. In different embodiments, the gateway server 18 may use any combination of the above impersonation techniques to impersonate the device 12 to the authentication server 28 and the other local servers located on the LAN 22.

Figure 4:
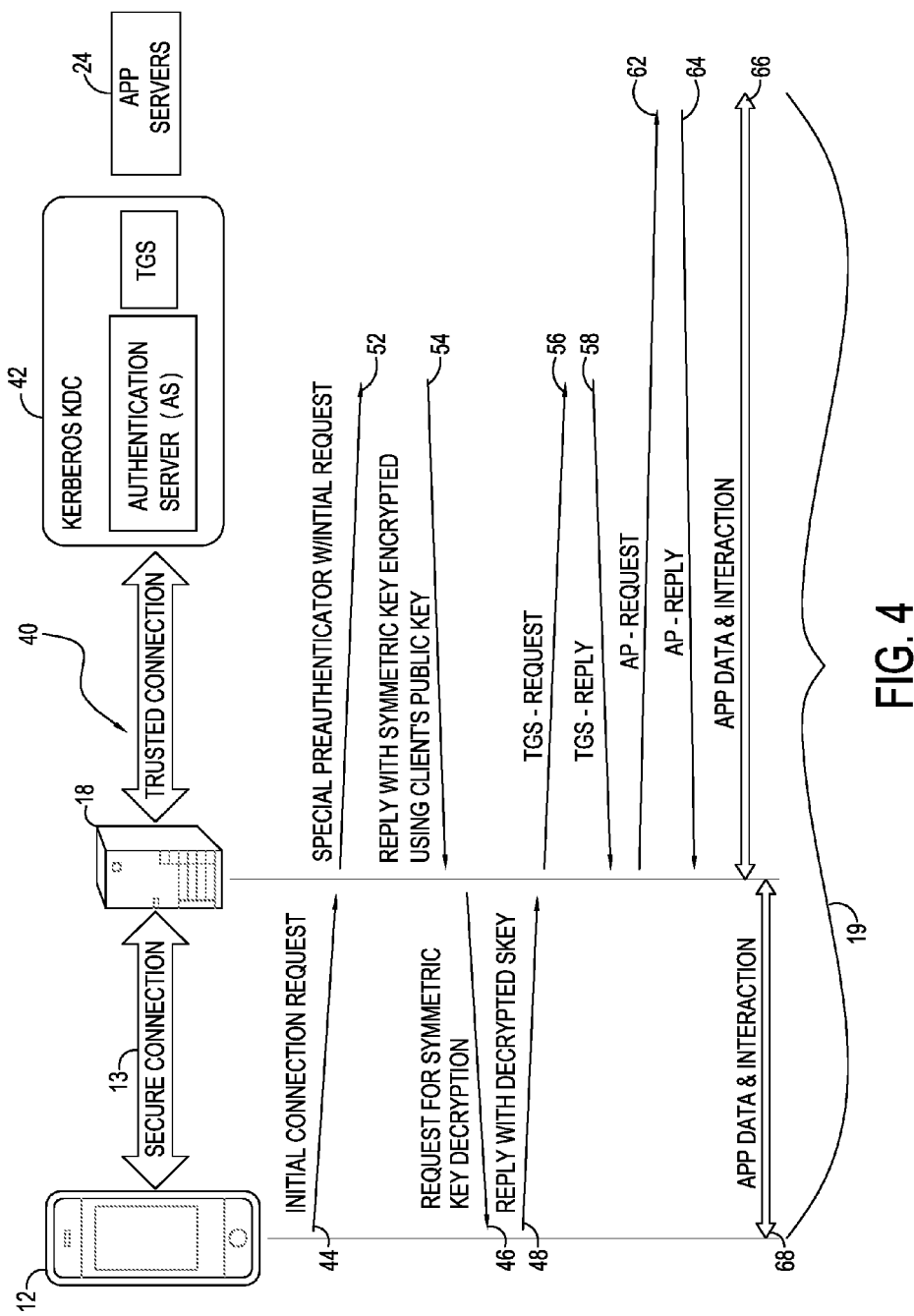
FIG. 4 illustrates one embodiment of a method of establishing a secure communications path between a first local server on a local network and a device on a wide area network.

FIG. 4 illustrates one embodiment of a method 40 of establishing a secure communications path 19 between a first local server 24 on a local network and a device 12 on a wide area network 14. In the embodiment shown in FIG. 4, a method that includes the use of the Kerberos authentication protocol is provided. In other embodiments, other protocols may be implemented. In some embodiments, public key infrastructure and variations of the same maybe used. In yet other embodiments, various single-sign mechanisms may be used. In still other embodiments, combinations of the above protocols may be used.

In the embodiment shown in FIG. 4, the method is initiated by the device 12 and the gateway server 18 establishing a first secure connection 13. Similar to the method shown in FIG. 2, the secure connection 13 in system 40 is preferably established with a protocol found on the device's 12 operating system such as SSL or TLS. In a preferred embodiment, the gateway server 18 and device 12 authenticate themselves to each other using public/private key pairs, and optionally a key exchange mechanism such as Diffie-Hellman. See RFC 2631.

Once the first secure communication connection 13 is established between the device 12 and the gateway server 18, the device 12 sends a connection request 44 to establish a communication path with application server 24. The connection request 44 is sent to the gateway server 18 over the already establishes first secure communications connection 13. Depending on the type of authentication protocols being implemented, the device 12 may send a security token to the gateway 18 to allow the gateway to authenticate to the authentication server 28 on behalf of the device 12. For example, the device 12 may include its public key and/or a signature using the device private key with the initial connection request.

The software application running on the server that is designed to set up the secure communication path receives the initial connection request from the device 12 and repackages the request in the appropriate protocol to send to the authentication server 42. In the embodiment shown in FIG. 4, the authentication server 42 requires all connections to be authenticated using the Kerberos protocol with PKINIT. Accordingly, the gateway server creates an initial request including the public key of the device 12 formatted for compatibility with the Kerberos protocol.

If PKINIT is used in conjunction with the Kerberos protocol the device 12 may send its public key and a signature using its private key with the initial connection request. In other embodiments that use Kerberos with PKINIT, the signature using the device's private key may occur in reaction to a directive from the gateway server 18. In other embodiments that use Kerberos without PKINIT, the public key may not be sent and instead a user password or other credential may be subsequently used for authentication and/or encryption in place of the device's 12 public/private key pair.

The gateway server 18 sends the initial connection request 52 to a Kerberos KDC 42. Preferably, the Kerberos KDC is embodied in a server in communication with the LAN 22. In the embodiment shown in FIG. 4, the Kerberos KDC includes both the Kerberos authentication server (AS) and the Kerberos ticket granting server (TGS). In other embodiments, the Kerberos AS and TGS may be implemented on different servers.

The AS running on the KDC 42 verifies that the connection request 52 is coming from a device that is authorized to establish a connection. In some embodiments, the AS may verify the connection request 52 by checking the username against a database of usernames. In other embodiments, like those that use PKINIT, the AS may verify the public key/certificate and/or signature sent with the initial request 52. In still other embodiments, other authentication credentials may be used to verify the request 52 is coming from an authorized device. For example, strong authentication protocols often use various types of advanced credentials to authenticate a device or an end user. In some embodiments, the strong authentication credentials maybe smart cards or common access cards or secure universal serial bus (USB) tokens, soft tokens, digital certificates, the presence of other software components, biometrics, NFC input, gesture input, GPS or other sensor inputs.

Once the AS has verified the initial request 52, the AS may reply 54 with an encrypted security key. Kerberos uses symmetric keys but asymmetric keys may be used in other embodiments. In embodiments that include PKINIT, the AS may encrypt the symmetric key with the public key provided in the initial request 52, or with another intermediate symmetric key that is itself encrypted with the public key provided in the initial request 52. In other embodiments that use Kerberos, the symmetric key may be encrypted using a private password, or a key derived from the private password, known only to the AS and the device 12 or user. In still other embodiments, other types of key exchanges or encryption techniques may be used.

In embodiments that use Kerberos without PKINIT, the AS may encrypt the secret with a key derived by hashing the password of the user found in the database. In a preferred embodiment, the database may be Active Directory or any other type of database.

In the embodiment shown in FIG. 4, a reply 54 is sent once the initial request has been verified. The reply 54 may be composed of more than one packet or message. In embodiments that use Kerberos, the reply 54 is actually composed of a message in two (2) parts: Message Part A includes an encrypted Client/TGS Session Key. Message Part B includes the Ticket-Granting-Ticket encrypted using the Client/TGS Session Key.

In the embodiment shown in FIG. 4, both reply message parts 54 are received by the gateway server 18. In a preferred embodiment, like the one shown in FIG. 4, Message Part A is passed on 46 by the gateway server 18 to the device 12 and Message Part B is retained by the gateway server 18. In other embodiments, both parts may be retained or both parts may be passed on by the gateway server 18. In the embodiment shown in FIG. 4, Message Part A is passed on 46 because the secret key needed to decrypt the information in Message Part A is only known to the device 12. In embodiments that use Kerberos and/or PKINIT, this information may be a user password or a private key of a public/private key pair. In embodiments that implement other protocols, other decryption or key exchange information may reside on device 12.

Some embodiments may not pass any authentication information onto the device 12. In such embodiments, the gateway server 18 may have the secret key needed to decrypt the information in Message Part A and thus not need to pass Message Part A onto the device 12. The gateway server 18 may have obtained the secret key from the device 12 in a prior transmission or may be pre-programmed with the secret key.

In embodiments where only the device 12 knows the secret key to decrypt the information in Message Part A, the gateway server 18 passes Message Part A, or some part of the contents of Message Part A, onto the device 12 and the device 12 decrypts the information and replies 48 to the gateway server 18 with the decrypted information over the first established secure communication 13.

In a preferred embodiment that uses Kerberos, the decrypted information includes the decrypted Client/TGS Session Key and/or an intermediate symmetric key which itself encrypts the Client/TGS Session Key. In other embodiments, other information needed to authenticate or used in the authentication process may be supplied to the gateway 18 by the client 12 to allow the gateway server 18 to impersonate the device 12 during the remainder of the authentication.

The exchange of the information needed by the gateway server 18 to impersonate the device 12 may be handled by the software application running on the gateway server 18 and the software application running on the device 12. In the preferred embodiment, this includes passing Message Part A to the device, decrypting the Client/TGS Session Key and/or intermediate symmetric key by the device 12, and the communication of the Client/TGS Session Key and/or intermediate symmetric key back to the gateway server 18 among other tasks. In other embodiments that use authentication protocols other than Kerberos, other pieces of security information may be exchanged in order to allow the gateway server 18 to impersonate the device 12 to the servers on the LAN 22.

In the embodiment shown in FIG. 4, once the gateway server 18 has received the Client/TGS Session Key and/or intermediate symmetric key from the device 12, the gateway server 18 has all the information it needs to finish the authentication routine on behalf of the device 12.

As shown in FIG. 4, the gateway server 18 completes the authentication on behalf of the device once it has the Client/TGS Session Key by sending the TGS Request 56 to the TGS server and receiving the TGS-Reply 58 from the TGS server and then sending the AP request 62 to the local server 24, optionally encapsulated in a SPNEGO token, and receiving the AP reply 64 from the local server 24, also optionally encapsulated in a SPNEGO token.

Once the TGS reply is received by the gateway server 18, the gateway server 18 may establish a secure communications connection between the gateway server 18 and the local server 24. Once the secure communications connection between the gateway server 18 and the local server 24 is established, a secure communications path 19 may be established between the device 12 and the local server 24 via the gateway server 18. The secure communications path 19 is composed of the first secure communication connection 18 between the device 12 and the gateway server 18 and the second secure communications connection between the gateway server 18 and the local server 24. The gateway server 18 proxies, forwards, or relays data back and forth between the device 12 and the local server 24 over the two secure communications connections.

Figure 5:
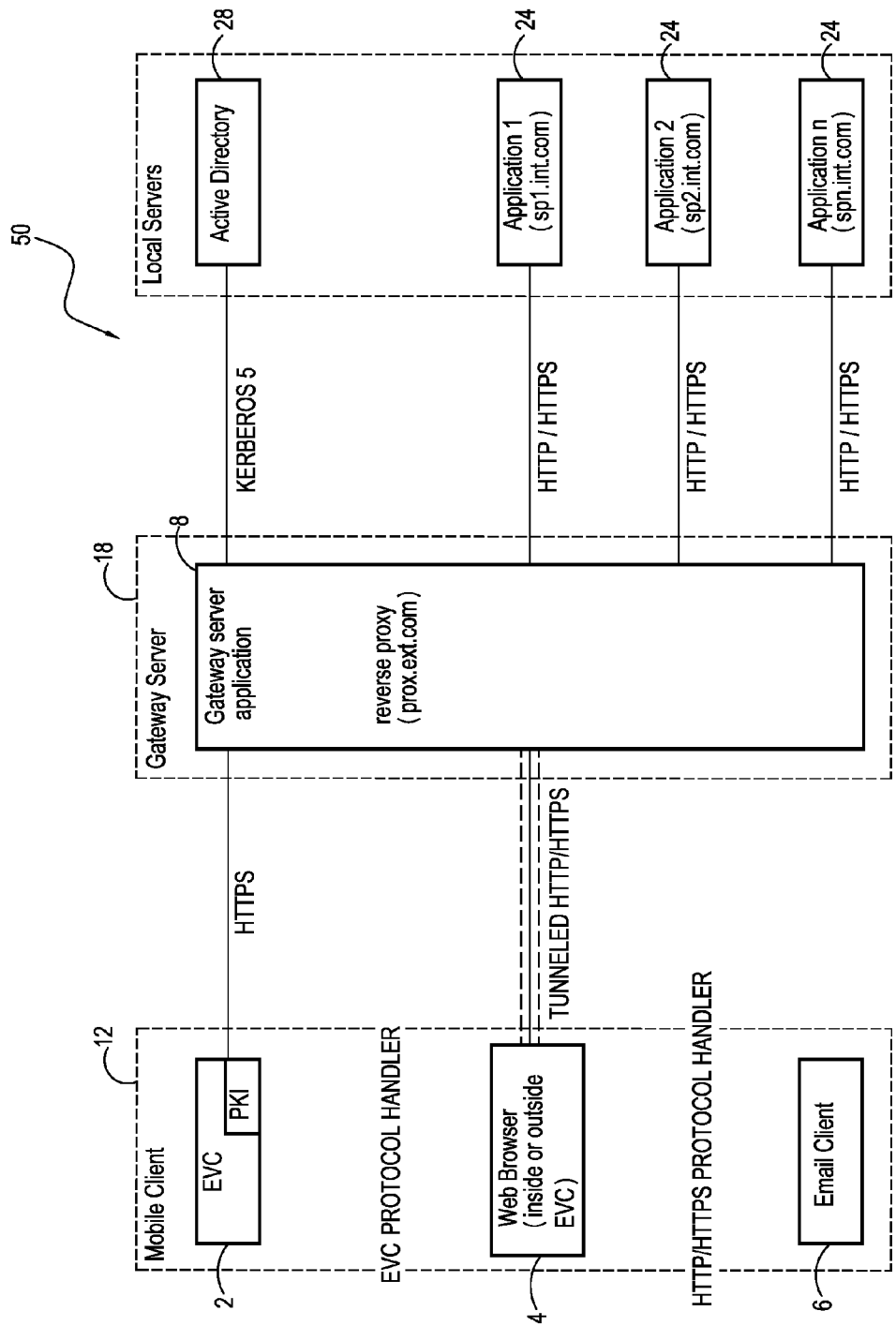
FIG. 5, illustrates one embodiment of an overall architecture of a system for establishing a secure communications path between a local server on a local network and a device on a wide area network.

FIG. 5, illustrates one embodiment of an overall architecture of a system 50 for establishing a secure communications path between a local server on a local network and a device on a wide area network. Two custom software applications are incorporated into the embodiment of the system 50 shown in FIG. 5: 1) The Enterprise Virtual Container (EVC) application 2 running on the device 12; and 2) The gateway server application 8 running on the server 18. In a preferred embodiment, the server 18 is located in the enterprise DMZ.

The embodiment of the system 50 shown in FIG. 5 assumes that a pre-existing VPN or other secure communication tunnel has been opened between the device 12 and the enterprise DMZ (or at least the server 18) in order to allow a proxy for non-contained applications to be configured and the communications to be protected on devices 12 running iOS®, Android® or another mobile operating system. In various embodiments, VPN or secure tunnel software may be used including but not limited to stunnel, OpenVPN, stud, OpenVPN ALS, OpenSSH, strongSwan, or Openswan. In a preferred embodiment, the VPN or secure tunnel software terminates the tunnel and extracts the HTTP request from the tunneled TPC or UDP packet. In some embodiments, the VPN or secure tunnel software may be implemented as a custom module in the server software.

The device 12, which may be a mobile client, may also include a web browser 4 and an email client 6. The web browser 4 and the email client 6 may be running in conjunction with the EVC 2 or stand alone. The gateway server 18 includes the gateway server application 8 and may also include a proxy to relay communications once the data path between the device 12 and the local server 24 is established. In the system shown in FIG. 5, the proxy is a reverse proxy, but may also be a forward proxy, or may provide any combination of reverse and forward proxy functionality.

In a preferred embodiment, gateway server 18 is running server software. Preferably, the server software is Apache HTTP Server. However in other embodiments, other server software may be used such as, NginX, Squid, Pound, Varnish, OpenVPN ALS, MS TMG, MS UAG, proprietary server software, or others. Custom extensions may need to be developed for the server software in order to implement the methods and systems described herein.

Figure 6:
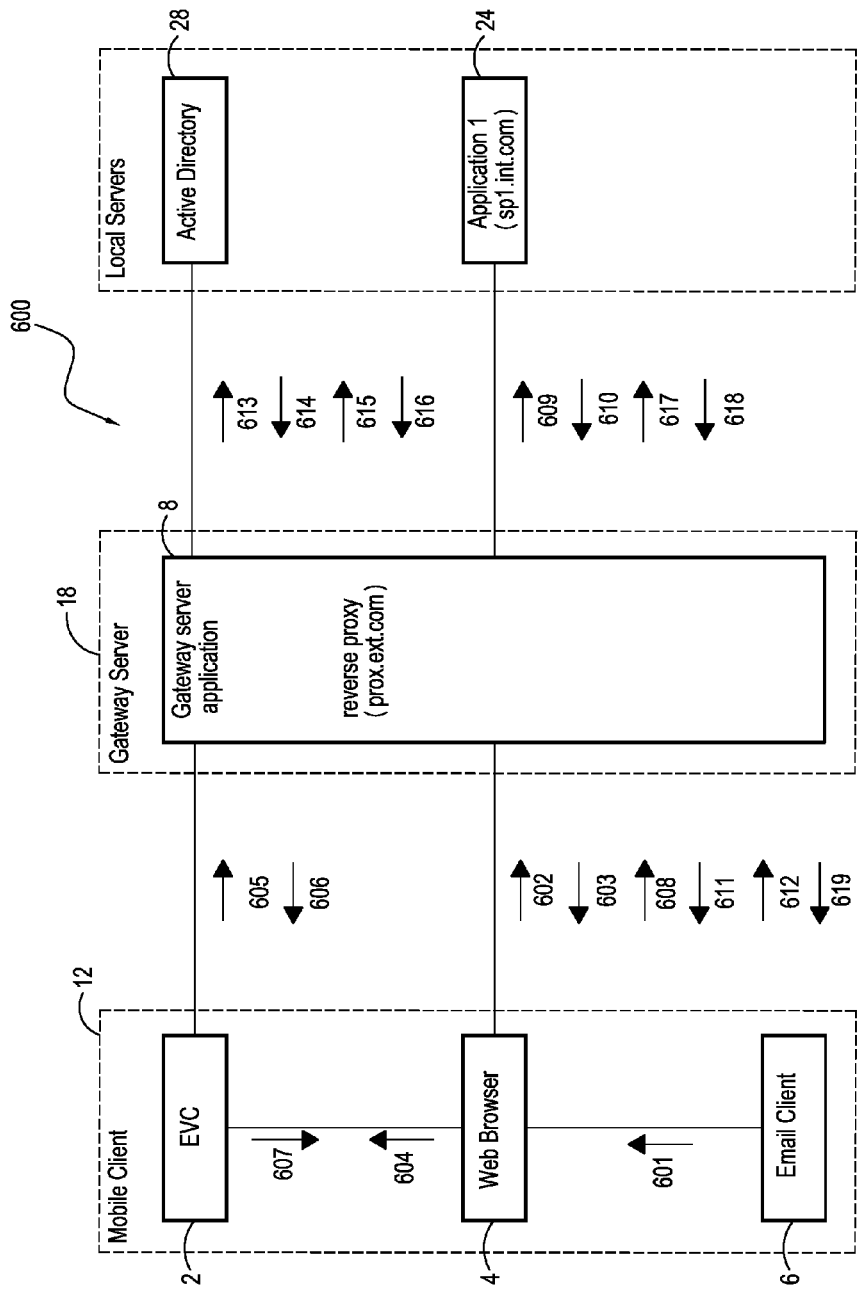
FIG. 6 illustrates one embodiment of the communication between the various subsystems for an HTTP request for a protected web application from an email client (or other mobile application relying on the mobile web browser) incorporating Kerberos constrained delegation.

FIG. 6 illustrates one embodiment of the communication between the various subsystems for an HTTP request for a protected web application from an email client (or other mobile application relying on the mobile web browser), for one embodiment incorporating Kerberos constrained delegation.

As shown in the example of FIG. 6, the email client 6 sends a communication request 601 (http://sp1.int.com) intended for the server 24 located on the local network. The communication request 601 is routed through the web browser 602 (http://sp1.int.com) located on the client to the gateway server 18. In the embodiment shown in FIG. 6, the gateway server 18 receives the communication request 602 for the local server 24 and returns a temporary resource redirect response 603 (HTTP 302 evc://prox.ext.com/auth?http&sp1.int.com) redirecting the communications request 602 to the proxy server via the EVC application 2. In the embodiment shown in FIG. 6, and preferably, the gateway server 18 returns a redirect to the EVC 2 when the gateway server 18 receives a request for a protected web application without a session token (either as a URL parameter or as an HTTP session cookie). In the embodiment shown in FIG. 6, an HTTP 302 message is returned to inform the web browser on the device 12 to redirect the request.

Because of the redirect response, the web browser on the device 12 forwards the communications request 604 (evc://prox.ext.com/auth?http&sp1.int.com) to the EVC 2. The EVC 2 then sends an HTTPS message 605 (https://prox.ext.com/auth?http&sp1.int.com) to the gateway server 18 requesting authentication to establish the communication connection with the local server 24.

The gateway server 18 again replies with a redirect response 606 (HTTP 302 http://sp1.int.com?stoken=xyz) including a gateway server session token for setting up a session with the gateway server 18. In order for the gateway server 18 to share authenticated user states between an initial SSL authentication from the EVC and subsequent HTTP/HTTPS requests from the mobile web browser, an encrypted session token may be generated by the gateway server 18 and passed back to the EVC 2 as a URL parameter, HTTP session cookie, or other parameter. The session token may then be resent to the gateway server 18 as a URL parameter, HTTP session cookie, or other parameter in subsequent HTTP/HTTPS requests. In some embodiments, the EVC 2 will maintain a local persistent cache with the session token in order to return the session token as a URL parameter, HTTP session cookie, or other parameter in a subsequent HTTP/HTTPS request for a different application or internal domain. The gateway server may maintain authenticated session states for each application or internal domain via an HTTP session cookie with the session token.

The EVC 2 receives the redirect response 606 from the gateway server 18 and forwards 607 (http://sp1.int.com?stoken=xyz) the communications connection request back to the web browser on the device 12. The session token is signed and the web browser on the device 12 forwards the request 608 (http://sp1.int.com?stoken=xyz) including the session token back to the gateway server 18 requesting connection to the local server 24.

When the gateway server receives the communication connection request including the session token 608, it forwards the communications request 609 (http://sp1.int.com) to the local server 24. The local server 24 replies 610 (HTTP 401 "WWW-Authorization: Negotiate") with an unauthorized error letting the server know that authentication is required. In the embodiment shown in FIG. 6, the local server 24 sends a HTTP 401 error message to inform the gateway server that authentication is required. The gateway server 18 reacts to the HTTP 401 "WWW-Authenticate: Negotiate" received from the local server 24 and triggers the Kerberos negotiation to retrieve a Kerberos service ticket and SPNEGO token, and inject the SPNEGO token in the "Authorization: Negotiate" header of a new HTTP request 617.

To this end, the gateway server 18 sends 611 (HTTP 302 http://sp1.int.com+injectspnego) another redirect message 302 back to the device 12 such that the device requests SPNEGO authentication in the response 612 (http://sp1.int.com+injectspnego).

The gateway server 18 now has enough information to authenticate on behalf of the device 12 and it does so with a series of messages 613-617 (613: Krb5 Protocol Transition; 614: Krb5 TGT; 615: Krb5 Constrained Delegation; 616: Krb5 ST) to the authentication server 28. Once the gateway server 18 authenticates on behalf of the device 12 with the authentication server, it requests 617 (http://sp1.int.com+Authorization: Negotiate <SPNEGO>) a connection to the local server 24. The secure connection between the gateway server 18 and the local server 24 is established and the local server 24 responds to the gateway server 18 in message 618 (HTTP 200+Response). The gateway server 18 proxies the response 619 (HTTP 200+Response) back to the device 12 and the secure communications path between the device 12 and the local server 24 is complete.

In other embodiments, the gateway server 18 may exchange the series of messages 613-617 at the time that it receives request 608, as opposed to waiting for the local server 24 to reply with an unauthorized error letting the gateway server know that authentication is required. In these embodiments, messages 609-12 are not exchanged. In still other embodiments the gateway server 18 may exchange the series of messages 613-617 at the time that it receives message 610 such that messages 611 and 612 are not exchanged.

Figure 7:
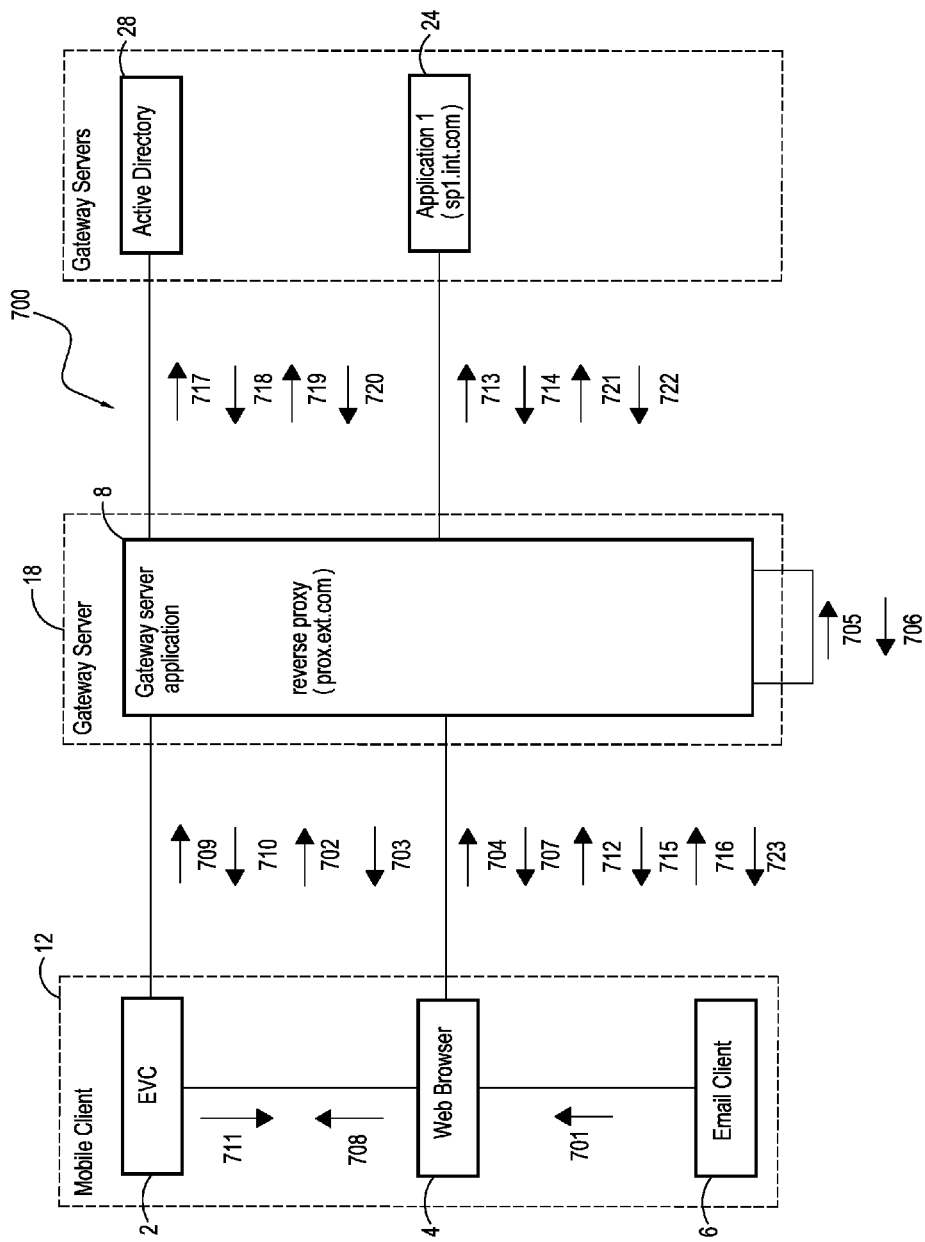
FIG. 7 illustrates one embodiment of the communication between the various subsystems for an HTTPS request for a protected web application from an email client (or other mobile application relying on the mobile web browser) incorporating Kerberos constrained delegation.

FIG. 7 illustrates one embodiment of the communication between the various subsystems for an HTTPS request 701 (https://sp1.int.com) for a protected web application from an email client (or other mobile application relying on the mobile web browser) incorporating Kerberos constrained delegation. The embodiment shown in FIG. 7 for HTTPS is very similar to the embodiment shown in FIG. 6 for HTTP except for the initial stages of the connection. In the embodiment shown in FIG. 7, when the device 12 sends an HTTP Connect request 702 (http connect sp1.int.com) to the gateway server 18, a connection is immediately established 703 (HTTP 200 Connection established). The device then sends an HTTPS communication request 704 (https://sp1.int.com) for a connection to the local server 24 to the gateway server 18. The gateway server 18 processes the requests 705 (https//sp1.int.com) and 706 (HTTP 302 evc://prox.ext.com/auth?https&sp1.int.com) and sends a redirect 707 (HTTP 302 evc://prox.ext.com/auth?https&sp1.int.com) back to the web browser of the device 12. Other than the use of HTTPS instead of HTTP, the message 707 in FIG. 7 is an equivalent step to 603 in FIG. 6 and the process in FIG. 7 continues using the same steps as the process in FIG. 6 until a secure communications path is established between the device 12 and the local server 24. The following are the additional messages sent in the embodiment shown in FIG. 7: (708: evc://prox.ext.com/auth?https&sp1.int.com; 709: https://prox.ext.com/auth?https&sp1.int.com; 710: HTTP 302 https://sp1.int.com?stoken=xyz; 711: https://sp1.int.com?stoken=xyz; 712: https://sp1.int.com?stoken=xyz; 713: https://sp1.int.com; 714: HTTP 401 "www-Authenticate: Negotiate"; 715: HTTP 302 https://sp1.int.com+injectspnego; 716: http://sp1.int.com+injectspnego; 717: Krb5 Protocol Transition; 718: Krb5 TGT; 719: Krb5 Constrained Delegation; 720: Krb5 ST; 721: https://sp1.int.com+Authorization: Negotiate <SPNEGO>; 722: HTTP 200+Response; 723: HTTP 200+Response).

Figure 8:
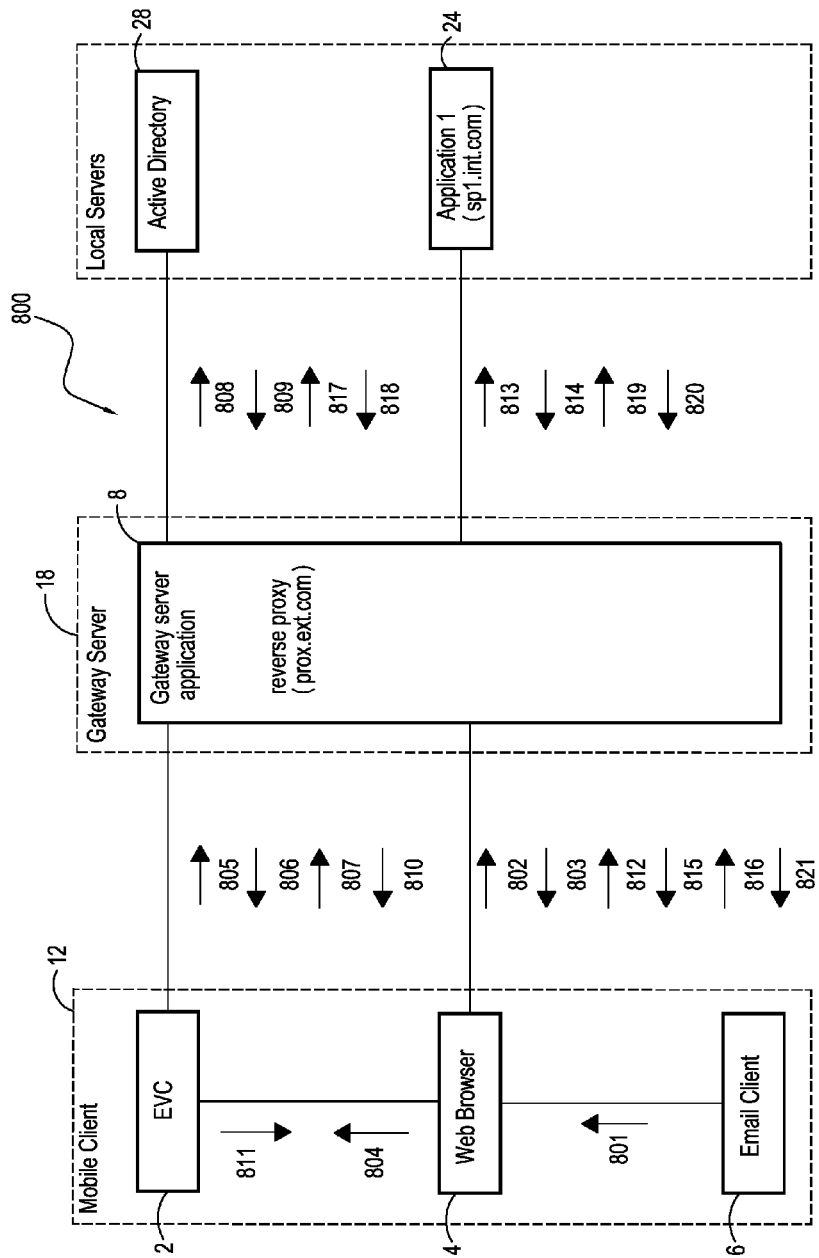
FIG. 8 illustrates one embodiment of the communication between the various subsystems for an HTTP request for a protected web application from an email client (or other mobile application relying on the mobile web browser) incorporating Kerberos PKINIT.

FIG. 8 illustrates one embodiment of the communication between the various subsystems for an HTTP request for a protected web application from an email client (or other mobile application relying on the mobile web browser) incorporating Kerberos PKINIT. Steps 801-805 (801: http://sp1.int.com; 802: http://sp1.int.com; 803: HTTP 302 evc://prox.ext.com/auth?http&sp1.int.com; 804: evc://prox.ext.com/auth?https&sp1.int.com; 805: https://prox.ext.com/auth?https&sp1.int.com) are similar in embodiment 800 to the steps in embodiment 600 in FIG. 6. However, the processes differ slightly after message 805. In embodiment 800, the gateway server 18 replies with a PKINIT Challenge( ) in message 806 (HTTP 407+PKINIT Challenged). The device 12 replies 807 (https://prox.ext.com/auth?http&sp1.int.com+PKINIT Response( ) to the gateway server 18 with the PKINIT Response( ) and then the gateway server 18 requests access from the authentication server 28 on behalf of the device 12 in messages 808 (AS-REQ) and 809 (AS-REP).

In the embodiment shown in FIG. 8, the Kerberos Ticket Granting Ticket (TGT) for a communication request are retrieved (808-809) by the gateway server 18 at the time the device 12 authenticates (805, 806, 807, 810) to the gateway server 18 and the session tokens are generated. In some embodiments a second exchange of messages 806 and 807 may occur after the Kerberos TGT is retrieved by the gateway server 18 for the purposes of retrieving a session key that is able to decrypt the Kerberos TGT. In the embodiment 800, Kerberos TGTs are retained in order to later request Kerberos service tickets for back-end applications. This is due to limitations in the maximum allowed cookie size in some browsers (total of ~4 k) and the large size of Kerberos TGTs in the Windows® environment. For users with a large number of roles, it may not be possible to embed the Kerberos TGTs inside gateway server session tokens or in HTTP headers without compromising the performance of the system. Therefore, the embodiment shown in FIG. 8 caches the Kerberos TGTs on the gateway server 18 and associates them with, and protects them by, the gateway server session tokens.

In other embodiments, a fully distributed solution where the cached Kerberos TGTs, and by extension the gateway server session tokens, are not tied to a single gateway server instance may be used.

In the embodiment 800, once the gateway server 18 has the authentication server reply 809, the gateway server 18 sends a redirect 810 (HTTP 302 http://sp1.int.com?stoken=xyz) back to the device and the EVC 2 on the device 12 the communications connection request back to the web browser 811 (http://sp1.int.com?stoken=xyz). The browser replies 812 (http://sp1.int.com?stoken=xyz) to the gateway server 18. The gateway server 18 then requests 813 (http://sp1.int.com) a connection to the local server 24 on behalf of the device 12 and gets an unauthorized error 814 (HTTP 401 "WWW-Authenticate: Negotiate") similar to message 610 in embodiment 600.

In embodiment 800, messages 815 and 816 (815: HTTP 302 http://sp1.int.com+injectspnego; 816: http://sp1.int.com+injectspego) are then exchanged between the gateway server 18 and the device 12 similar to messages 611 and 612 in embodiment 600. In embodiment 800, the gateway server 18 has all the information it needs to authenticate on behalf of the client after it receives message 816 and it finishes the Kerberos authentication by exchanging message 817 (TGS-REQ) and 818 (TGS-REP) with the Ticket Granting Server (TGS) 28 and then requesting a communications connection 819 (http://sp1.int.com+Authorization: Negotiate <SPNEGO>) with the local server 24 and establishing a communications path 820 (HTTP 200+Response) and 821 (HTTP 200+Response) between the local server 24 and the device 12.

In other embodiments, the gateway server 18 may exchange the series of messages 817-818 at the time that the gateway server 18 receives request 812, as opposed to waiting for the local server 24 to reply with an unauthorized error letting the gateway server know that authentication is required. In these embodiments, messages 813-816 are not exchanged. In still other embodiments the gateway server 18 may exchange the series of messages 817-818 at the time that it receives message 814 such that messages 815 and 816 are not exchanged.

Figure 9:
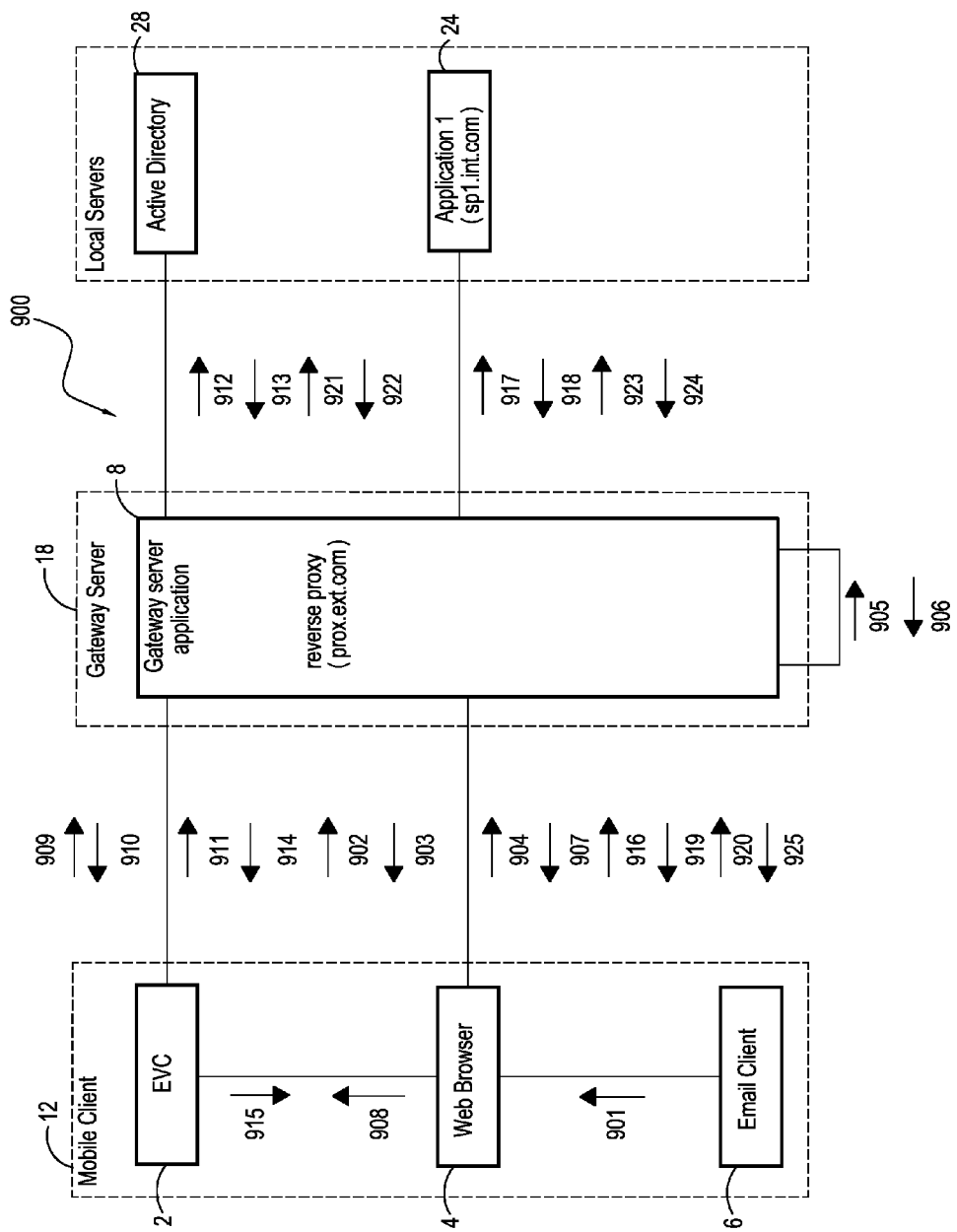
FIG. 9 illustrates one embodiment of the communication between the various subsystems for an HTTPS request for a protected web application from an email client (or other mobile application relying on the mobile web browser) incorporating Kerberos PKINIT.

FIG. 9 illustrates one embodiment of the communication between the various subsystems for an HTTPS request for a protected web application from an email client (or other mobile application relying on the mobile web browser) incorporating Kerberos PKINIT. The embodiment 900 differs from embodiment 800 shown in FIG. 8 in the same way embodiment 700 shown in FIG. 7 differs from embodiment 600 shown in FIG. 6. The following are the messages sent in the embodiment shown in FIG. 9: (901: https://sp1.int.com; 902: HTTP CONNECT sp1.int.com; 903: HTTP 200 Connection established; 904: https://sp1.int.com; 905: https://sp1.int.com; 906: HTTP 302 evc://prox.ext.com/auth?https&sp1.int.com; 907: HTTP 302 evc://prox.ext.com/auth?https&sp1.int.com; 908: prox.ext.com/auth?https&sp1.int.com; 909: https://prox.ext.com/auth?https&sp1.int.com; 910: HTTP 407+PKINIT Challenge( ) 911: https://prox.ext.com/auth?http&sp1.int.com+PKINIT Response; 912: AS-REQ; 913: AS-REP; 914: HTTP 302 http://sp1.int.com?stoken=xyz; 915: https://sp1.int.com?stoken=xyz; 916: https://sp1.int.com?stoken=xyz; 917: http://sp1.int.com; 918: HTTP 401 "WWW-Authenticate: Negotiate"; 919: HTTP 302 https://sp1.int.com+injectspnego; 920: http://sp1.int.com+injectspnego; 921: TGS-REQ; 922: TGS-REP; 923: http://sp1.int.com+Authorization: Negotiate <SPNEGO>; 924: HTTP 200+Response; 925: HTTP 200+Response).

Although, the embodiments disclosed herein create a secure communications path 19 that includes an intermediate gateway server 18 that authenticates, proxies, forwards, or relays data between the two ultimate connection points, the methods and systems described and taught herein work seamlessly with existing authentication protocols. For example, if Kerberos is used, nothing special needs to be done with the Kerberos KDC, AS or TGS in order to make it compatible with the embodiments disclosed herein. Once the gateway server 18 is configured with the server application and the device is equipped with the secure container, integration is seamless to the existing LAN services. Accordingly, embodiments described in the present patent document teach methods and systems for enabling strong authentication without direct network access to strong authentication servers.

What is claimed is:

1. A method of establishing a secure communications path between a first local server on a local network and a device on a wide area network, the method comprising:
   establishing a first secure communications connection between a second local server on the local network and the device, the first secure communications connection using a first secure protocol;
   receiving, at the second local server, a request from the device on the wide area network for a connection with the first local server;
   receiving, at the second local server, a message from the first local server over the local network including:
      an encrypted first part; and
      a second part;
   passing, from the second local server, the encrypted first part of the message to the device for decryption by the device while withholding the second part from the device;
   receiving, at the second local server, at least a portion of a decrypted first part of the message from the device over the first secure communications connection, the device having decrypted the encrypted first part of the message;
   establishing a second secure communications connection between the second local server and the first local server using the portion of the decrypted first part of the message and the second part withheld from the device, the establishing of the second secure communications connection performed in a second secure protocol that is different from the first secure protocol; and
   proxying, by the second local server, data between the first local server and the device.

2. The method of claim 1, wherein the device limits access to the first secure communications connection to one or more select applications.

3. The method of claim 1, wherein the second local server limits access to the first secure communications connection to one or more select applications.

4. The method of claim 1, wherein the second secure communications connection is established using a Kerberos network authentication protocol.

5. The method of claim 1, wherein the second local server impersonates the device by receiving a session key from the device over the first secure communications connection and using the session key to establish the second secure communications connection.

6. The method of claim 5, wherein the session key is decrypted by the second local server using an intermediate key that is decrypted by the device using a decryption key known only to the device.

7. The method of claim 5, wherein the session key is established using a key exchange protocol.

8. The method of claim 5, wherein the session key is used to authenticate on behalf of the user by decrypting a Kerberos ticket.

9. The method of claim 1, wherein the first local server and the second local server are separated by a local area network (LAN) firewall and the second local server is located in a demilitarized zone (DMZ) of the local network.

10. The method of claim 1, wherein the second local server impersonates the device to an authentication server on the local network during the establishing of a second secure communications connection.

11. The method of claim 1, wherein the first secure communications connection is established after the second local server intercepts a communications request from the device to the first local server.

12. The method of claim 11, wherein the second local server redirects the communications request back to the device with instructions to establish the first secure communications connection.

13. The method of claim 1, wherein the first secure communications connection is established when an authorized applications starts.

14. The method of claim 1, wherein the second local server intercepts a communications request from the device to the first local server and redirects the communications request back to the device with instructions to resubmit the communications request with additional security information.

15. The method of claim 14, wherein the additional security information includes a session key.

16. The method of claim 1, wherein the device is a cell phone or a tablet.

17. A system for establishing a secure communications path between a local server on a local network and a device on a wide area network comprising:
   a firewall separating the local network from the wide area network;
   a second server, comprising a processor operatively coupled with a computer memory, located on the local network and in communication with both the wide area network and local network, wherein the second server is configured to:
      establish a first secure communications connection with the device over the wide area network, the first secure communications connection using a first secure protocol;
      receive a request from the device on the wide area network for a connection with the local server;
      receive a message from the first local server over the local network including:
         an encrypted first part; and
         a second part;
      pass the encrypted first part of the message to the device for decryption by the device while withholding the second part from the device;
      receive at least a portion of a decrypted first part of the message from the device over the first secure communications connection, the device having decrypted the encrypted first part of the message;
      establish a second secure communications connection with the local server using the portion of the decrypted first part of the message and the second part withheld from the device, the establishment of the second secure communications connection performed in a second secure protocol that is different from the first secure protocol; and
      proxy, by the second server, data between the local server and the device.

18. The system of claim 17, further comprising an application running on the device that limits access to the first secure communications connection to select applications.

19. The system of claim 17, wherein the second server impersonates the device by receiving a session key from the device over the first secure communications connection and uses the session key to establish the second secure communications connection.

20. The system of claim 17, further comprising a second firewall separating the second server and the local server.

21. The system of claim 17, further comprising an authentication server on the local network, which authenticates connections to the local server.

22. The system of claim 17, wherein the second secure communications connection is established using a Kerberos network authentication protocol.

23. The system of claim 21, wherein the second server impersonates the device to the authentication server by receiving a session key from the device over the first secure communications connection.

24. The system of claim 20, wherein the second server is located in a demilitarized zone (DMZ) of the local network.

25. The system of claim 21, wherein the local server and the authentication server have limited or no access to communicate with the wide area network.

26. The system of claim 21, wherein the second server impersonates the device to the authentication server.

27. The system of claim 17, wherein the device is a cell phone or a tablet.

28. The method of claim 1, wherein the first secure communications connection is established by an application running on the device that limits access to the first secure communications connection to one or more select applications.

29. The method of claim 28, wherein the connection is established after the second local server intercepts a request from the one or more select applications on the device to the first the first local server on the local network.

30. The method of claim 28, wherein the connection is established after the application running on the device that limits access to the first secure communications connection intercepts a communications request from the one or more select applications on the device to a local server on the local network.

31. The method of claim 28, wherein the first secure communications connection is established when the application running on the device that limits access to the communications connection starts.

32. The method of claim 28, wherein the first secure communications connection is established when one of the select applications starts.

33. The method of claim 28, wherein the second local server redirects communications requests from the one or more select applications that occur outside the first secure communications connection back to the application running on the device that limits access to the secure communications connection to select applications.

34. The method of claim 33, wherein the redirected communications requests are resubmitted inside the first secure communications connection.

35. The method of claim 34, wherein the communications requests are resubmitted with additional security information.

36. The method of claim 35 wherein the additional security information includes a session key.

37. The method of claim 33, wherein the redirected communications requests are resubmitted outside the first secure communications connection with additional security information.

38. The method of claim 37, wherein the additional security information includes a session key.

39. A non-transitory computer readable storage medium embodying information indicative of instructions for establishing a secure communications path between a first local server on a local network and a device on a wide area network, the instructions causing one or more computers to perform operations comprising:
  establishing a first secure communications connection between a second local server on the local network and the device, the first secure communications connection using a first secure protocol;
  receiving, at the second local server, a request from the device on the wide area network for a connection with the first local server;
  receiving, at the second local server, a message from the first local server over the local network including:
    an encrypted first part; and
    a second part;
  passing, from the second local server, the encrypted first part of the message to the device for decryption by the device while withholding the second part from the device;
  receiving, at the second local server, at least a portion of a decrypted first part of the message from the device over the first secure communications connection, the device having decrypted the encrypted first part of the message;
  establishing a second secure communications connection between the second local server and the first local server using the portion of the decrypted first part of the message and the second part withheld from the device, the establishing of the second secure communications connection performed in a second secure protocol that is different from the first secure protocol; and
  proxying, by the second local server, data between the first local server and the device.

40. The medium of claim 39, wherein the device limits access to the first secure communications connection to one or more select applications.

41. The medium of claim 39, wherein the second local server limits access to the first secure communications connection to one or more select applications.

42. The medium of claim 39, wherein the second secure communications connection is established using a Kerberos network authentication protocol.

43. The medium of claim 39, wherein the second local server impersonates the device by receiving a session key from the device over the first secure communications connection and uses the session key to authenticate on behalf of the device.

44. The medium of claim 43, wherein the session key is decrypted by the device using a decryption key known only to the device.

45. The medium of claim 43, wherein the session key is decrypted by the second local server using an intermediate key that is decrypted by the device using a decryption key known only to the device.

46. The medium of claim 43, wherein the session key is established using a key exchange protocol.

47. The method of claim 1, further comprising:
  sending, from the second local server, an initial request to an authentication server over the local network.

48. The method of claim 1, wherein the encrypted first part of the message includes an encrypted session key.

49. The method of claim 1, wherein the second part of the message includes a Kerberos ticket granting ticket (TGT).

* * * * *

UNITED STATES PATENT AND TRADEMARK OFFICE
CERTIFICATE OF CORRECTION

PATENT NO. : 9,722,972 B2
APPLICATION NO. : 13/405357
DATED : August 1, 2017
INVENTOR(S) : Ahmed et al.

It is certified that error appears in the above-identified patent and that said Letters Patent is hereby corrected as shown below:

On the Title Page

On page 2, Column 2, under Other Publications, Line 18, delete "AnyOffice" and insert -- Any Office --, therefor.

On page 3, Column 1, under Other Publications, Line 26, delete "/upoads/" and insert -- /uploads/ --, therefor.

On page 3, Column 2, under Other Publications, Line 10, delete "Preliminaiy" and insert -- Preliminary --, therefor.

In the Drawings

On sheet 4 of 9, in FIG. 4, under Reference Numeral 52, Line 1, delete "W/INTIAL" and insert -- W/INITIAL --, therefor.

On sheet 4 of 9, in FIG. 4, under Reference Numeral 48, Line 1, delete "SKEY" and insert -- KEY --, therefor.

In the Specification

In Column 3, Line 6, delete "a the" and insert -- the --, therefor.

In Column 5, Line 28, delete "-Helman." and insert -- -Hellman. --, therefor.

In Column 19, Line 29, delete "Challenged)." and insert -- Challenge()). --, therefor.

Signed and Sealed this
Thirteenth Day of February, 2018

Andrei Iancu
*Director of the United States Patent and Trademark Office*

CERTIFICATE OF CORRECTION (continued)
U.S. Pat. No. 9,722,972 B2

In the Claims

In Column 23, Lines 35-36, in Claim 29, delete "the first the first" and insert -- the first --, therefor.